(12) United States Patent
Baba et al.

(10) Patent No.: US 8,724,641 B2
(45) Date of Patent: May 13, 2014

(54) COMMUNICATION SYSTEM AND CONTROL METHOD FOR COMMUNICATION SYSTEM

(75) Inventors: Takashige Baba, Inagi (JP); Kazuma Yumoto, Fuchu (JP); Akihiko Takase, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 546 days.

(21) Appl. No.: 13/017,141

(22) Filed: Jan. 31, 2011

(65) Prior Publication Data

US 2011/0235647 A1 Sep. 29, 2011

(30) Foreign Application Priority Data

Mar. 24, 2010 (JP) ................................. 2010-067197

(51) Int. Cl.
*H04L 12/56* (2011.01)
(52) U.S. Cl.
USPC .......................................................... 370/401
(58) Field of Classification Search
None
See application file for complete search history.

(56) References Cited

U.S. PATENT DOCUMENTS

| 7,185,106 | B1 | 2/2007 | Moberg et al. | |
|---|---|---|---|---|
| 7,307,990 | B2 | 12/2007 | Rosen et al. | |
| 2003/0055933 | A1* | 3/2003 | Ishizaki et al. | 709/223 |
| 2007/0248091 | A1* | 10/2007 | Khalid et al. | 370/392 |
| 2008/0107126 | A1 | 5/2008 | Oguchi | |
| 2008/0133719 | A1* | 6/2008 | Amitai et al. | 709/221 |
| 2010/0290485 | A1* | 11/2010 | Martini et al. | 370/477 |
| 2011/0090819 | A1* | 4/2011 | Zheng | 370/254 |
| 2011/0126110 | A1* | 5/2011 | Vilke et al. | 715/736 |
| 2011/0286456 | A1* | 11/2011 | Kompella | 370/390 |

FOREIGN PATENT DOCUMENTS

| EP | 1 337 076 A1 | 8/2003 |
|---|---|---|
| JP | 2003-234752 A | 8/2003 |
| JP | 2006-033106 A | 2/2006 |
| JP | 2009-033215 A | 2/2009 |

OTHER PUBLICATIONS

Chinese Office Action in Chinese Application No. 201110033524.7 dated Apr. 12, 2013.

* cited by examiner

*Primary Examiner* — Hassan Phillips
*Assistant Examiner* — Duc Duong
(74) *Attorney, Agent, or Firm* — Mattingly & Malur, PC

(57) ABSTRACT

When connecting a plurality of packet processing parts each having a packet processing function as an added function of a virtual network for each user, there was a problem that the number of packet processing units that were connectable, a function of analyzing a communication packet, etc. were dependent on a transport technology of a core network of a virtual network. A communication system including the packet processing unit for performing an information processing of the communication packet on the virtual network has a virtual network system for the packet processing unit in addition to a wide area core network in a wide area network service.

13 Claims, 23 Drawing Sheets

FIG. 5

| VIRTUAL NETWORK SYSTEM 1 USER IDENTIFIER (K501) | VIRTUAL NETWORK SYSTEM 2 USER IDENTIFIER (K502) | USER IDENTIFIER (K503) |
|---|---|---|
| 1 | 10 | A |
| 2 | 20 | B |
| 3 | 30 | C |
| 4 | 40 | D |
| 5 | 50 | E |
| 6 | 60 | F |
| ⋮ | ⋮ | ⋮ |

| PACKET PROCESSING PART NUMBER (K601) | VIRTUAL NETWORK SYSTEM 2 USER IDENTIFIER (K602) | USER IDENTIFIER (K603) |
|---|---|---|
| 1 | 10 | A |
| 2 | 20 | B |
| 3 | 40 | D |
| ⋮ | ⋮ | ⋮ |

| USER IDENTIFIER | VIRTUAL NETWORK SYSTEM 1 USER IDENTIFIER | VIRTUAL NETWORK SYSTEM 2 USER IDENTIFIER | PACKET PROCESSING UNIT IDENTIFICATION NUMBER | PACKET PROCESSING PART NUMBER |
|---|---|---|---|---|
| A | 1 | 10 | 1 | 1 |
| B | 2 | 20 | 1 | 2 |
| C | 3 | 30 | – | – |
| D | 4 | 40 | 1 | 3 |
| E | 5 | 50 | 2 | 1 |
| F | 6 | 60 | 2 | 2 |
| ... | ... | ... | ... | ... |

K701  K702  K703  K704  K705

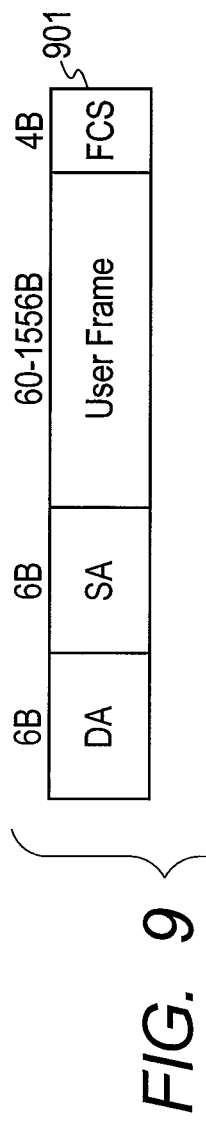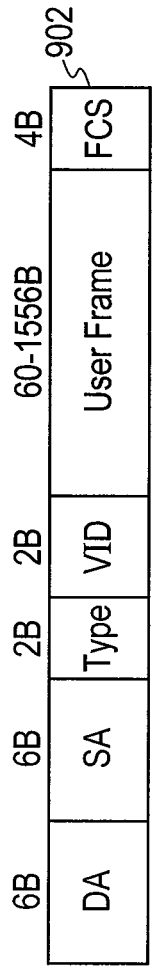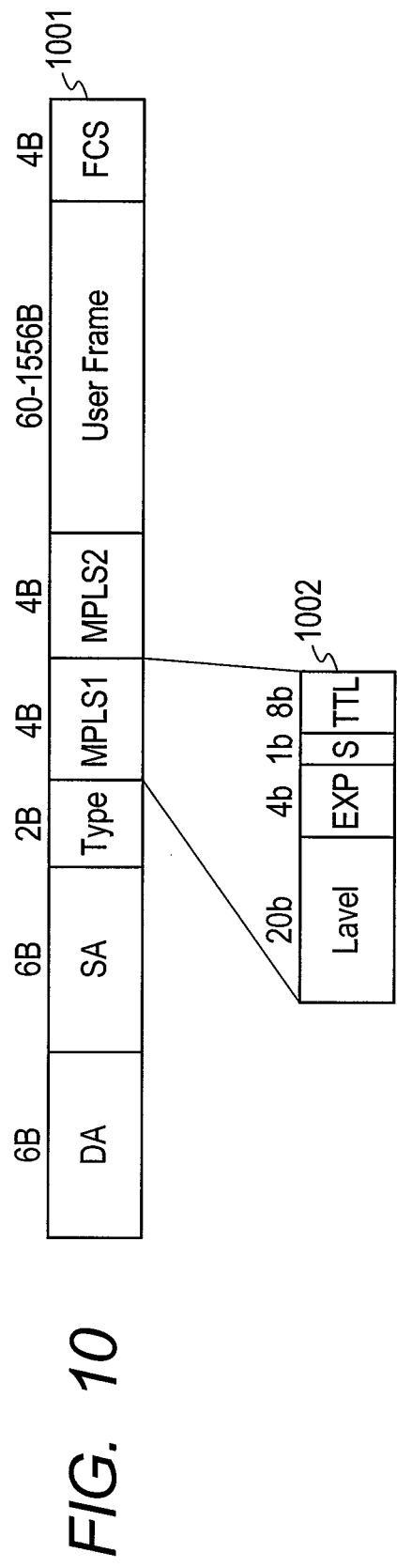
FIG. 9
FIG. 10

FIG. 17

| USER IDENTIFIER K701 | VIRTUAL NETWORK SYSTEM 1 USER IDENTIFIER K702 | VIRTUAL NETWORK SYSTEM 2-1 USER IDENTIFIER K7031 | VIRTUAL NETWORK SYSTEM 2-2 USER IDENTIFIER K7032 | ... | PACKET PROCESSING UNIT IDENTIFICATION NUMBER K704 | PACKET PROCESSING PART NUMBER K705 |
|---|---|---|---|---|---|---|
| A | 1 | 10 | – | | 1 | 1 |
| B | 2 | 20 | – | | 1 | 2 |
| C | 3 | – | 10 | | – | – |
| D | 4 | – | 20 | | 1 | 3 |
| E | 5 | 50 | 30 | | 2 | 1 |
| F | 6 | 60 | – | | 2 | 2 |
| ... | ... | ... | ... | | ... | ... |

| USER IDENTIFIER K701 | VIRTUAL NETWORK SYSTEM 1 USER IDENTIFIER K702 | VIRTUAL NETWORK SYSTEM 2-1 USER IDENTIFIER K7031 | VIRTUAL NETWORK SYSTEM 2-2 USER IDENTIFIER K7032 | ... | PACKET PROCESSING IDENTIFICATION NUMBER K704 | PACKET PROCESSING PART NUMBER K705 |
|---|---|---|---|---|---|---|
| A | 1 | 10 | – | | 1 | 1 |
| B | 2 | 20 | – | | 1 | 2 |
| C | 3 | – | 10 | | – | – |
| D | 4 | – | 20 | | 1 | 3 |
| E | 5 | 50 | 30 | | 2 | 1 |
| F | 6 | 60 | – | | 2 | 2 |
| ... | ... | ... | ... | | ... | ... |

1601

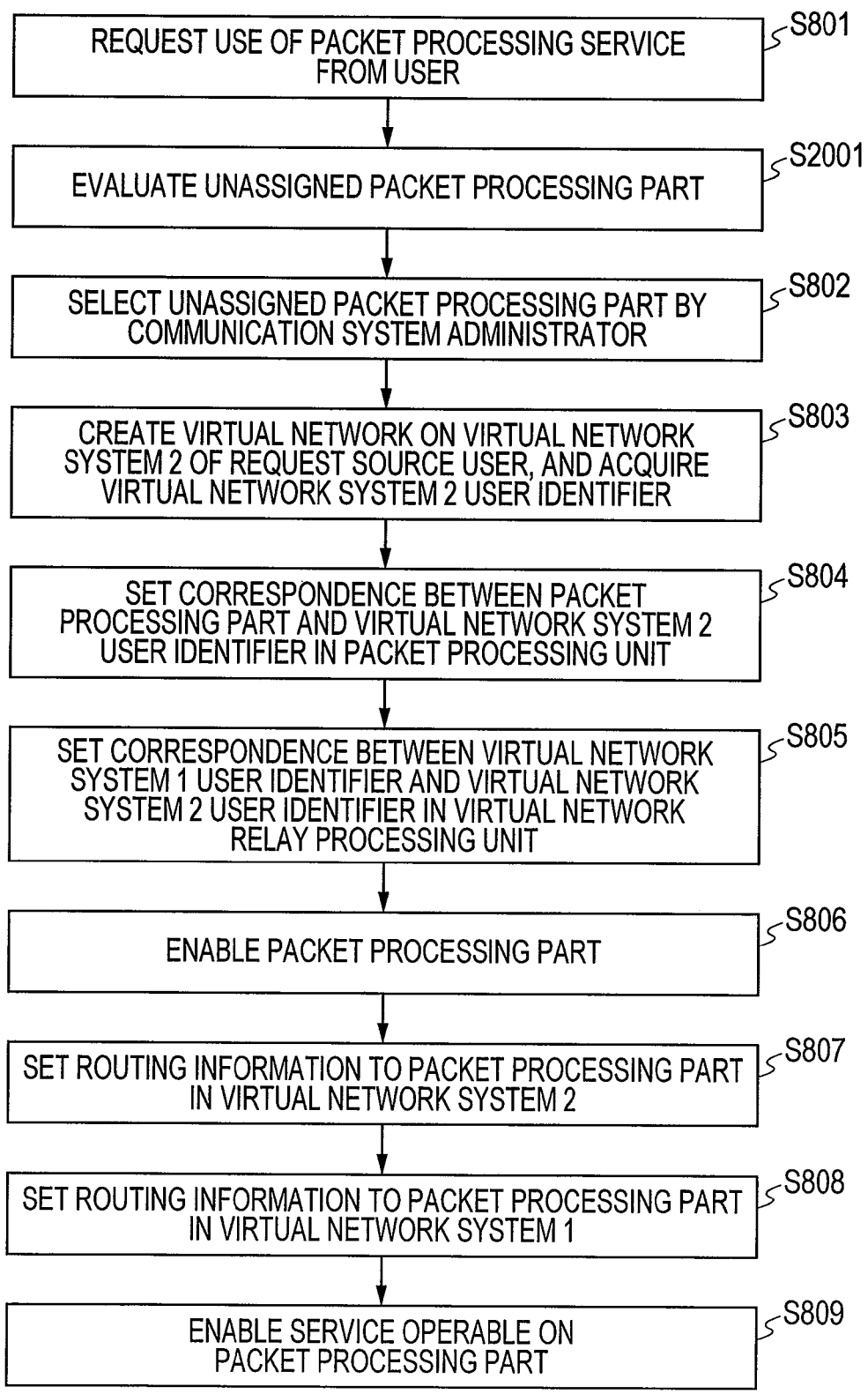

FIG. 21

| PACKET PROCESSING UNIT IDENTIFICATION NUMBER K2101 | PACKET PROCESSING PART NUMBER K2102 | ASSIGNMENT SITUATION K2103 | CPU PERFORMANCE K2104 | MEMORY QUANTITY K2105 | COMMUNICATION PERFORMANCE K2106 |
|---|---|---|---|---|---|
| 1 | 1 | ALREADY ASSIGNED | 100 | 100 MB | 100 Mbps |
| 1 | 2 | ALREADY ASSIGNED | 100 | 100 MB | 100 Mbps |
| 1 | 3 | ALREADY ASSIGNED | 100 | 100 MB | 100 Mbps |
| 1 | 4 | NOT ASSIGNED | 200 | 200 MB | 100 Mbps |
| 1 | 5 | NOT ASSIGNED | 100 | 100 MB | 100 Mbps |
| 2 | 1 | ALREADY ASSIGNED | 50 | 100 MB | 200 Mbps |
| 2 | 2 | ALREADY ASSIGNED | 50 | 100 MB | 200 Mbps |
| 2 | 3 | NOT ASSIGNED | 100 | 50 MB | 200 Mbps |
| 2 | 4 | NOT ASSIGNED | 50 | 50 MB | 200 Mbps |
| ... | ... | ... | ... | ... | ... |

| PRIORITY K2201 | PACKET PROCESSING UNIT IDENTIFICATION NUMBER K2101 | PACKET PROCESSING PART NUMBER K2102 | CPU PERFORMANCE K2104 | MEMORY QUANTITY K2105 | COMMUNICATION PERFORMANCE K2106 |
|---|---|---|---|---|---|
| 1 | 1 | 4 | 200 | 200 MB | 100 Mbps |
| 2 | 1 | 5 | 100 | 100 MB | 100 Mbps |
| 3 | 2 | 3 | 100 | 50 MB | 200 Mbps |
| 4 | 2 | 4 | 50 | 50 MB | 200 Mbps |
| ... | ... | ... | ... | ... | ... |

| PRIORITY<br>K2201 | PACKET<br>PROCESSING UNIT<br>IDENTIFICATION NUMBER<br>K2101 | PACKET<br>PROCESSING<br>PART NUMBER<br>K2102 | CPU<br>PERFORMANCE<br>K2104 | MEMORY<br>QUANTITY<br>K2105 | COMMUNICATION<br>PERFORMANCE<br>K2106 / 2301 |
|---|---|---|---|---|---|
| 1 | 2 | 3 | 100 | 50 MB | 200 Mbps |
| 2 | 2 | 4 | 50 | 50 MB | 200 Mbps |
| 3 | 1 | 4 | 200 | 200 MB | 100 Mbps |
| 4 | 1 | 5 | 100 | 100 MB | 100 Mbps |
| ... | ... | ... | ... | ... | ... |

COMMUNICATION SYSTEM AND CONTROL METHOD FOR COMMUNICATION SYSTEM

CLAIM OF PRIORITY

The present application claims priority from Japanese patent application JP 2010-067197 filed on Mar. 24, 2010, the content of which is hereby incorporated by reference into this application.

FIELD OF THE INVENTION

The present invention relates to a virtual network technology whereby a plurality of users can share a network and the users construct respective virtual networks that are mutually independent among the users, and more specifically, to a technology of controlling a system including a packet processing unit for performing an information processing of a communication packet on the virtual network.

BACKGROUND OF THE INVENTION

A communication service that connects between information systems of users, such as of an enterprise, located at sites separated by distances, such as between cities, is called a wide area network service. Conventionally, comparatively expensive communication services connecting between the information system bases of the user, such as a private line and an ATM network, are used for the wide area network services. In recent year, IT of enterprise businesses have been enormously developed, and various pieces of information have been communicated between bases of an enterprise after being converted into electronic forms. In order to respond to such demands, the wide area Ethernet (registered trademark) that is easy to be connected to a user's information system at a lower cost and IP and Ethernet based wide area network services, such as an IP-VPN, have become increasingly used.

The IP and Ethernet based wide area network provides connection ease with a user's information system by utilizing a router device (hereinafter abbreviated as a router) by the use of IP that is a network standard protocol being used in the user's information system and a Ethernet technology. Moreover, interfaces that connect the routers use a transmission technology of a 10-Gbps wide band, and the IP and Ethernet based wide area network is made to be able to provide low cost services by a plurality of users sharing this wide band interface.

The IP and Ethernet based wide area network is constructed with core networks including router groups that form a foundation of the wide area network and edge routers each being a router for connecting the core network and a user's base. The communication packet used for communication between users' information system bases is encapsulated by the edge router, and a core network header used for communication within the core network is added to the communication packet. Since the router in the core network transfers the communication packet referring to the core network header, it can perform communication that uses the wide area network without altering the original user's communication packet.

In order for a plurality of users to share the wide area network, a user identification label for identifying a user is attached in the core network header. The router and edge router in the core network constitute a virtual private network for each user with the user identification label in the core network header, and are maintaining securability so that the communication packets between users may not be mixed mutually.

On the other hand, for sophistication of the network services, a service that provides a function of processing the user's communication packet has become increasingly used in addition to the above-mentioned wide area network service. There are various functions as a function of processing the communication packet, which include, for example, a monitoring function of the communication packet, a cache function of the communication packet, etc. As the packet processing unit for providing a processing of the communication packet, there are considered a computer device equipped with a general purpose CPU typified by Intel architecture ("Intel" is a registered trademark), a packet processing unit equipped with a network processor specialized in the packet processing, a packet processing unit equipped with a specific packet processing IC, etc. These packet processing units are selected in terms of high speed processing capability and programmability that are required as a communication packet processing function provided as a service.

[Patent document 1] U.S. Pat. No. 7,307,990
[Patent document 2] U.S. Pat. No. 7,185,106

SUMMARY OF THE INVENTION

In the case where a function of processing a user's communication packet as described above is provided as a wide area network service, following (1) to (3) become requirements.

(1) In the wide area network service, it is also necessary for the packet processing unit to provide a function of processing the communication packet to a plurality of users as a service in order to provide services to the plurality of users. In order to provide services to the plurality of users, it is necessary to use a plurality of packet processing units, or to accommodate the plurality of users in a single packet processing unit.

(2) In the wide area network service, a virtual network that is separated for each user is constructed and securability is provided so that the communication packets may not be mixed among the users. However, it is necessary to maintain securability so that the communication packets may not be mixed among the users also when a communication packet processing function is provided.

(3) Since the packet processing units are arranged not on information system bases of the users but on a system that constitutes the wide area network, it is necessary to connect the core networks constituting the wide area network and the packet processing units.

However, when providing the communication packet processing function that satisfies the requirements as described above as the wide area network service, the following problem is considerable.

From the above-mentioned requirement (1), the packet processing unit needs to receive the communication packets of the plurality of users and distribute the communication packets for the respective users. However, in the case where the packet processing unit is connected to the core network via an edge router, since a core network header is deleted, the communication packet that reaches the packet processing unit cannot be distributed to each user using the user identifier being used in the communication packet within the core network. Therefore, it is necessary to identify the user by information in the user's communication packet. However, since it is the user's communication packet, registration and management of the identification information are difficult, and since the user can rewrite the user's communication packet, the communication packets among the users cannot be separated perfectly; therefore, the securability of the above-mentioned requirement (2) cannot be maintained.

On the other hand, in the case where the packet processing unit is directly connected to the core network directly, the communication packet can be distributed for each user using the user identifier being used in the communication packet within the core network. However, although various kinds of transport technologies are used in the core network, the number of packet processing units connectable with the core network is limited by an upper limit of standardization specification of a protocol of the transport technology of the core network, a resource quantity of memory mounted on the router, etc. Therefore, there is a problem that the connectable number of the packet processing units is dependent on the transport technology of the core network.

Moreover, in this configuration, although it is necessary to analyze a format of the communication packet used in the core network, since the format of the communication packet is different for each transport technology used in the core network, it is necessary to develop an analysis function for each transport technology; therefore, this poses a problem that a system construction cost becomes high.

In order to solve the above-mentioned problem, one example of a communication system of this invention is a communication system for performing a relay processing of a first network (a virtual network system 1) and a second network (a virtual network system 2) each of which consists of a plurality of virtual networks each having logically divided communication ranges, wherein the communication system has: a network relay processing unit that is connected to a first network and a second network and that is constructed with first correspondence information showing a correspondence between a first identifier for identifying the communication packet in the first network and a second identifier for identifying the communication packet in the second network and an identifier conversion part for converting the identifier for identifying the communication packet based on the first correspondence information, and a packet processing unit that is constructed with a packet processing part that is connected to the second network and performs data reference and/or rewrite processing of the communication packet, second correspondence information showing a correspondence between the packet processing part and the second identifier, and a packet distribution part for distributing the communication packet received to the packet processing part based on the second correspondence information.

Moreover, as an example of another communication system, the network relay processing unit is characterized by having a network conversion part for converting communication-packet communication protocol information received into a packet format suitable for the transport technology of a network at a relay destination.

Furthermore, as an example of another communication system, the network relay processing unit is characterized is characterized by further having a management server, wherein the management server is connected to a network relay processing unit and a packet processing unit, and has a packet processing part assignment part for assigning the packet processing part to the user, third correspondence information showing a correspondence between the first identifier for identifying the assigned packet processing part and the user's communication packet, and the second identifier; and a setup management part for setting the first correspondence information and the second correspondence information based on the third correspondence information.

According to the invention of this application, by providing the virtual network system for the packet processing unit in addition to the wide area core network in the wide area network service, it becomes possible to carry out system construction freely without the number of packet processing parts being restricted by the transport technology of the core network. That is, it becomes possible to cancel restriction of scalability of the packet processing part resulting from the transport technology of the core network.

Moreover, it is possible to separate management of the core network and management of the virtual network oriented for the packet processing unit, and it is possible to curtail setup of the core network when adding or deleting the packet processing unit and the packet processing part. Thereby, serviceability of operation management of the communication system and the packet processing function improves.

Furthermore, since the packet input/output part of the packet processing unit is required to support a virtual network for exclusive use, even when the kind of transport technology of the core network changes, it is not necessary to mount thereon a packet input/output part that supports each transport technology; therefore, a development cost of the packet processing unit can be reduced.

BRIEF DESCRIPTION OF THE DRAWINGS

FIG. 5 is an explanatory diagram showing one example of virtual network relay information;

FIG. 6 is an explanatory diagram showing one example of packet processing part assignment information;

FIG. 7 is an explanatory diagram showing one example of user management information (the first thereof);

FIG. 9 is an explanatory diagram showing one example of a format of a communication packet at a user base;

FIG. 10 is an explanatory diagram showing one example of a format of the communication packet in a virtual network system 1;

FIG. 17 is an explanatory diagram showing one example of the user management information (the second thereof);

FIG. 19 is an explanatory diagram showing one example of the user management information (the third thereof);

FIG. 20 is a flowchart showing one example of a method for assigning the packet processing part to the user (the second thereof);

FIG. 21 is an explanatory diagram showing one example of packet processing unit management information;

FIG. 22 is an explanatory diagram showing one example of intermediate information that the packet processing unit management part creates;

FIG. 23 is an explanatory diagram showing one example of the intermediate information that the packet processing unit management part creates;

DETAILED DESCRIPTION OF THE PREFERRED EMBODIMENTS

Figure 1:
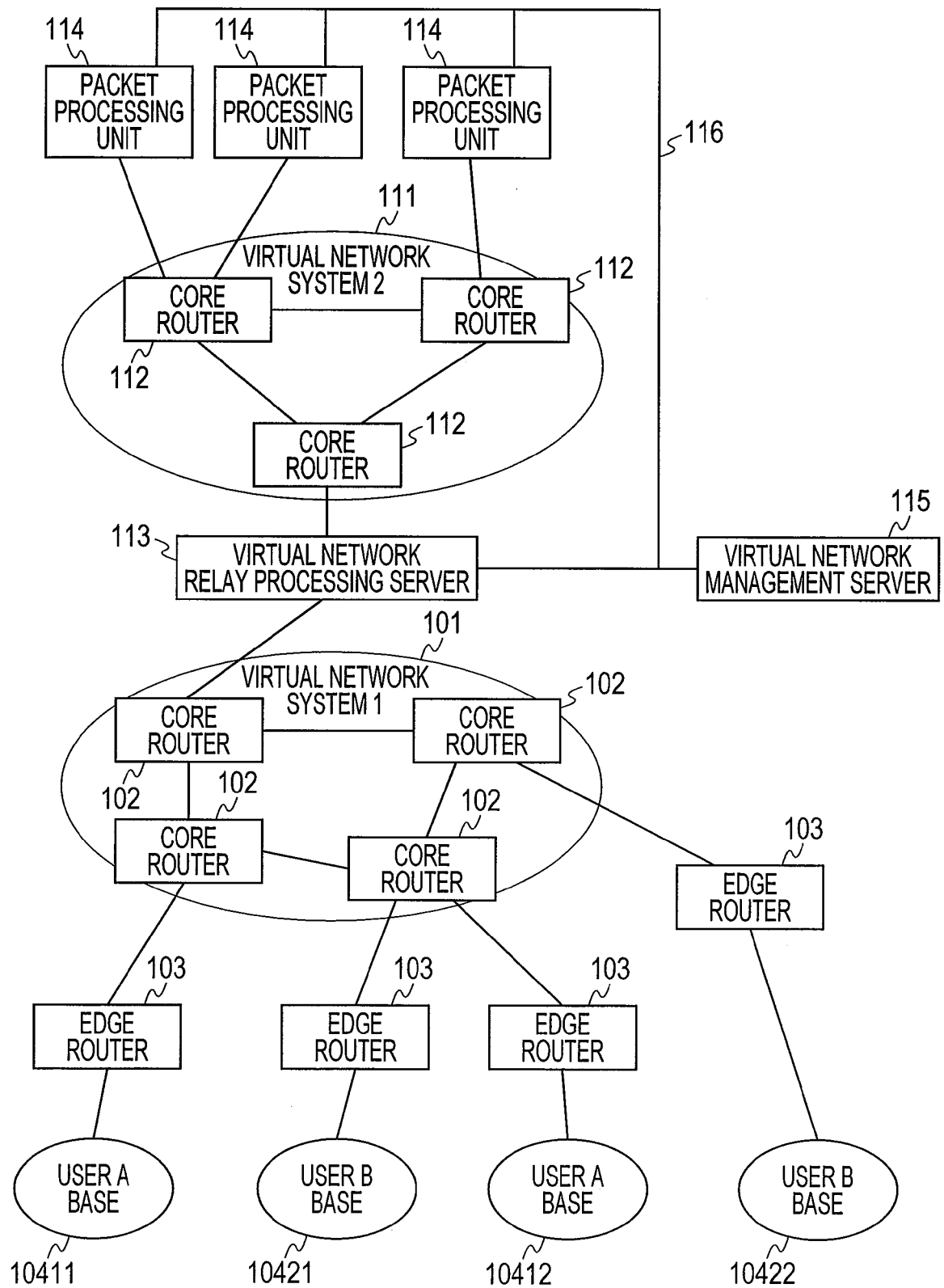
FIG. 1 is a block diagram of a physical device configuration of a communication system.

Hereafter, forms of implementation of the present invention will be described in details based on drawings. Incidentally, in order to explain the forms of implementation, the same member is given the same reference numeral as a general rule, and its repeated explanation will be omitted in principle in all the drawings.

First Embodiment

Figure 2:
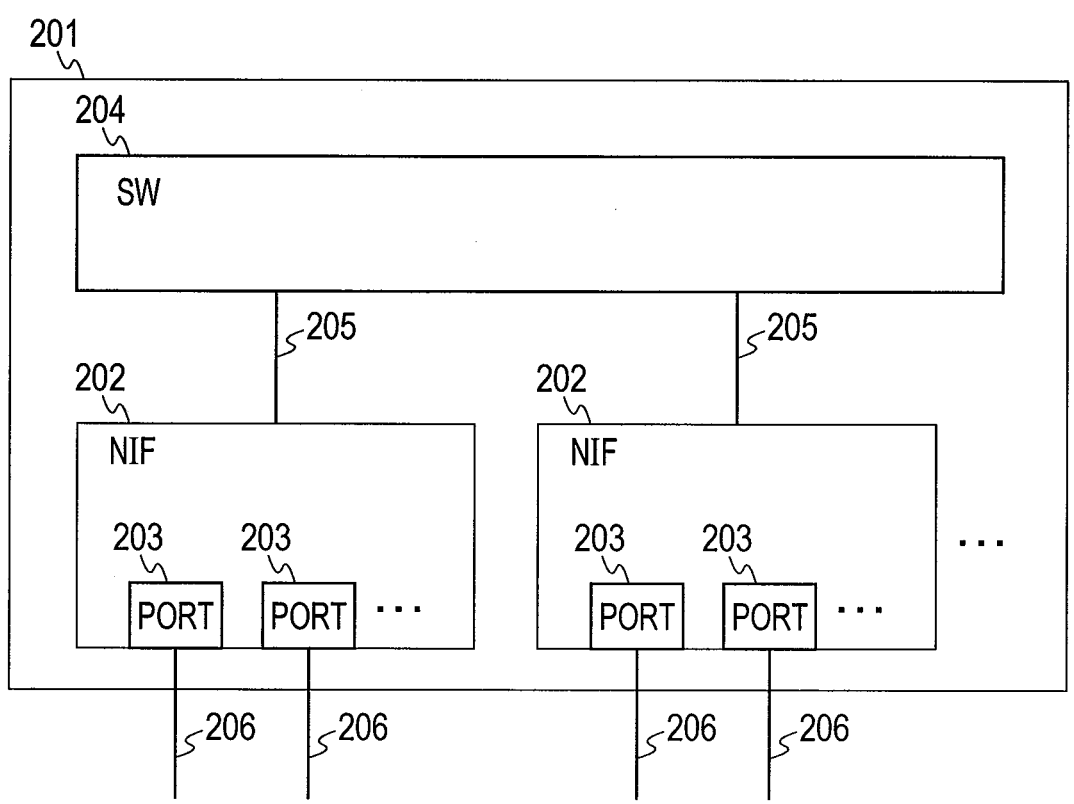
FIG. 2 is a block diagram of a physical configuration of a router device of the communication system.
Figure 3:
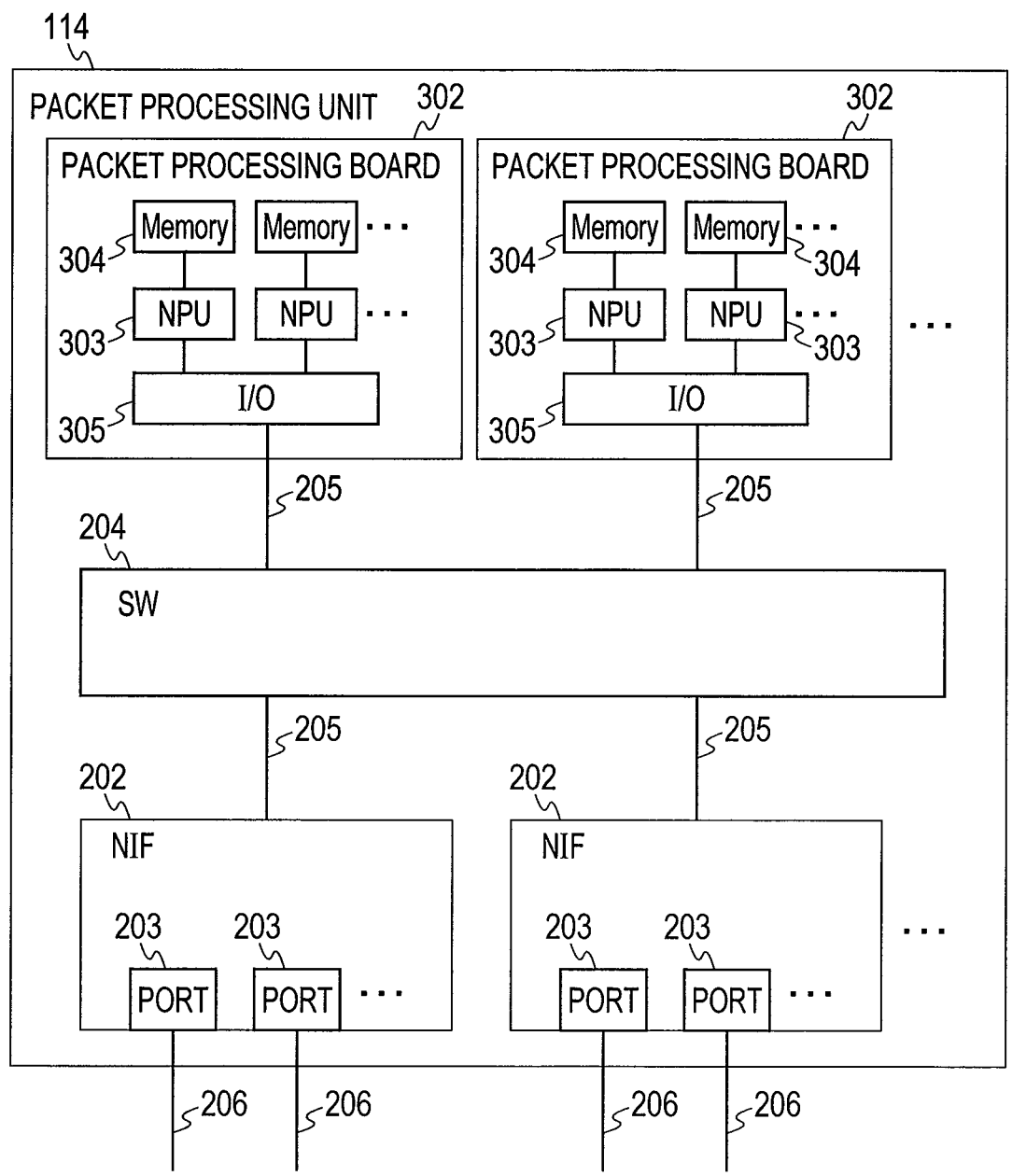
FIG. 3 is a block diagram of a physical configuration of a packet processing unit of the communication system (the first thereof)

First, a communication system according to a first form of implementation of the present invention will be explained. At the beginning, a configuration of a physical device of the communication system according to the first form of implementation of the present invention will be explained using FIG. 1 to FIG. 3. FIG. 1 is a block diagram of the physical device configuration of the communication system according to the first form of implementation of the present invention. FIG. 2 is a block diagram of a physical configuration of a router device of the communication system according to the first form of implementation. FIG. 3 is a block diagram of a physical configuration of a packet processing unit of the communication system according to the first form of implementation.

As shown in FIG. 1, the communication system in this form of implementation is constructed with: a virtual network system 1 (101) for providing a communication service among users' bases 104 that are information systems inside an enterprise of the users or information systems inside a data center; an edge router 103 for performing an encapsulation processing on a user's commutation packet in order to make the user's communication packet transferable in the virtual network system 1 (101); a packet processing unit 114 for providing a function of processing the user's communication packet to the user; a virtual network system 2 (111) for enabling the packet processing unit 114 to communicate with the user's base 104; a virtual network relay processing unit 113 for relaying the communication packet by connecting the virtual network system 1 (101) and the virtual network system 2 (111) mutually; and a virtual network management server 115 for performing setup, control, and operation managements of these communication systems.

A management network 116 connects the virtual network management server 115 with the edge router 103, the virtual network system 1 (101), the virtual network relay processing unit 113, the packet processing unit 114, and the virtual network system 2 (111) that are management objects. Incidentally, in FIG. 1, in order to make the figure easy to see, the management network 116 connected to the edge router 103, the virtual network system 1 (101), and the virtual network system 2 (111) are omitted. Moreover, the virtual network system 1 and the virtual network system 2 each consist of core routers (102, 112), respectively.

As shown in FIG. 1, the configuration of the physical devices of the communication system according to this embodiment is characterized in that, in order to connect the packet processing unit 114 to the virtual network system 1 (101), the virtual network system 2 (111) for exclusive use is constructed for the packet processing unit 114, and the communication system has the virtual network relay processing unit 113 for mutually connecting the virtual network system 1 (101) and the virtual network system 2 (111).

Next, physical configurations of units that constitute the communication system of this embodiment will be explained. Each of the core router 112, the edge router 103, and the virtual network relay processing unit 113 of FIG. 1 assumes a configuration of a typical router device 201 as shown in FIG. 2.

The typical router device 201 is constructed with a network interface card (NIF) 202 having an interface function of connecting another unit through a network and a switch (SW) 204 that makes the network interface cards 202 in the device mutually connect to one another with its internal interfaces 205 and performs packet transfer on an all-to-all basis. The network interface card 202 is equipped with a communication port (PORT) 203 of the interface for connecting to other units with communication cable 206. Since the core router 112, the edge router 103, and the virtual network relay processing unit 113 differ from one another in logical function, such as packet transfer and packet processing, they are discriminated as physical devices.

In the communication system according to this embodiment, the packet processing unit 114 of FIG. 1 assumes a configuration of the typical router device 201 of FIG. 2 added with a packet processing board 302 for processing the communication packet, as shown in FIG. 3. The network interface card 202, the communication port 203 of the interface, the switch 204, and the internal interface 205 have the same configuration as of the typical router device 201. On the other hand, the packet processing board 302 is constructed with a network processor (NPU) 303 capable of programming the processing of the communication packet, memory (Memory) 304 holding data necessary in the processing of the communication packet etc., and an I/O 305 that is connected to the switch 204 and inputs and outputs the communication packet. In the packet processing unit 114 of this embodiment, by assigning the packet processing board 302 to each user or by the packet processing board 302 to a plurality of users and allowing the users to use it in a sharing mode, the plurality of users can share the packet processing unit 114.

Figure 4:
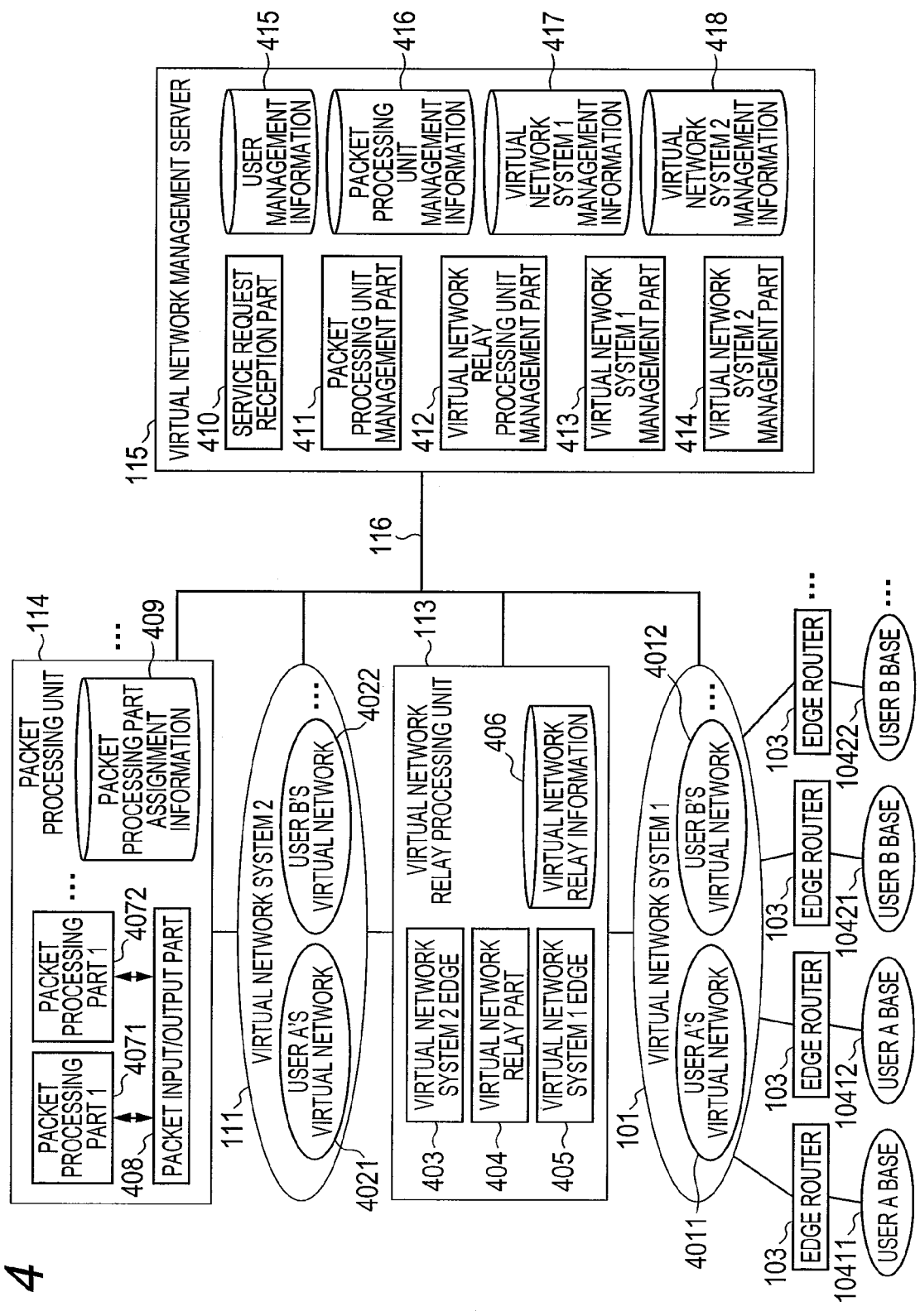
FIG. 4 is a block diagram of a logical configuration of the communication system (the first thereof)

Next, a logical configuration of this embodiment will be explained using FIG. 4 to FIG. 7. FIG. 4 is a block diagram of the logical configuration of the communication system according to the first form of implementation of the present invention, FIG. 5 is an explanatory diagram showing one example of virtual network relay information according to the first form of implementation, FIG. 6 is an explanatory diagram showing one example of packet processing part assignment information according to the first form of implementation, and FIG. 7 is an explanatory diagram showing one example of user management information according to the first form of implementation.

As shown in FIG. 4, the virtual network system 1 (101) constitutes the virtual networks separated for respective users: a user A's virtual network 4011, a user B's virtual network 4012, . . . . The users are enabled to perform communication among users' bases using virtual networks 4011, 4012 assigned to the users by connecting bases of users 10411, 10412, 10421, and 10422 to the virtual network system 1 (101) via the edge routers 103. For example, the user A can perform communication between a user A base 10411 and a user A base 10412 using the user A's virtual network 4011. In the virtual network system 1 (101), in order to completely separate the communication packet for each user, an identifier that is specific within the virtual network system 1 (101), i.e., the virtual network system 1 user identifier is added to the user's communication packet for each user.

For the users using the packet processing unit 114, the virtual network system 2 (111) constructs virtual networks that are separated for respective users: a user A's virtual network 4021, a user B's virtual network 4022, . . . . For the users who do not use the packet processing unit 114, no virtual network needs to be constructed on the virtual network system 2 (111). In the virtual network system 2 (111), in order to completely separate the communication packet for each user, an identifier that is specific within the virtual network system 2 (111), i.e., the virtual network system 2 user identifier is added to the user's communication packet for each user. Incidentally, in FIG. 4, in order to make the figure easy to see, the management network 116 to the edge router 103 is omitted.

The virtual network relay processing unit 113 is constructed with a virtual network system 1 edge 405, a virtual network system 2 edge 403, a virtual network relay part 404, and virtual network relay information 406. FIG. 5 is the virtual network relay information 406 that is shown in a table form, which is made up of at least a virtual network system 1 user identifier K501 for identifying the communication packet for each user in the virtual network system 1 (101) and a virtual network system 2 user identifier K502 for identifying the communication packet for each user in the virtual network system 2 (111). A user identifier K503 is a user name used for managing the user in the whole communication system, or an identifier.

Any communication packet in the virtual network system 1 (101) is added with information including the virtual network system 1 user identifier in order to transfer the packet in the virtual network system 1 (101). The virtual network system 1 edge 405 adds and deletes information including this virtual network system 1 user identifier. On the other hand, in order to transfer the communication packet in the virtual network system 2 (111), information including the virtual network system 2 user identifier is added to the communication packet in the virtual network system 2 (111). The virtual network system 2 edge 403 adds and deletes information including this virtual network system 2 user identifier.

In order to transfer the communication packet mutually between the virtual network system 1 (101) and the virtual network system 2 (111), the virtual network relay part 404 mutually converts the virtual network system 1 user identifier K501 and the virtual network system 2 user identifier K502 referring to the virtual network relay information 406. Moreover, since the protocol information included in the communication packet, for example, priority information, is different in format between the virtual network system 1 (101) and the virtual network system 2 (111), the protocol information is interconverted.

The packet processing unit 114 is constructed with packet processing parts 4071, 4072, . . . that provide the users with a communication packet processing function, a packet input/output part 408, and packet processing part assignment information 409. FIG. 6 is the packet processing part assignment information 409 that is shown in a table form, and is constructed with at least a packet processing part number K601 for identifying the packet processing parts 4071, 4072, . . . in the packet processing unit 114 and a virtual network system 2 user identifier K602 for identifying the communication packet in the virtual network system 2 (111) for each user. A user identifier K603 is a user name or identifier used for managing the user in the whole communication system.

The example of FIG. 6 shows that the packet processing part 4071 whose packet processing part number is 1 is assigned to a user A. In this way, each of the packet processing parts 4071, 4072, . . . is assigned to an individual user.

The packet input/output part 408 outputs and inputs the communication packet to/from the virtual network system 2 (111). Regarding the communication packet from the virtual network system 2 (111), the packet input/output part 408 refers to the virtual network system 2 (111) user identifier and the packet processing part assignment information 409 added to the communication packet, specifies one of the packet processing parts 4071, 4072, . . . that becomes a destination of the communication packet, and transfers it to the one of the packet processing parts 4071, 4072, . . . . Moreover, regarding communication packets from the packet processing parts 4071, 4072, . . . , the packet input/output part 408 refers to the packet processing part assignment information 409, and adds information including the virtual network system 2 user identifier to the communication packet so that the communication packet may be able to be transferred in the virtual network system 2.

For example, when a packet processing part 1 (4071) is assigned to the user A, the communication packet from the user A base 10411 is transferred to the virtual network relay processing unit 113 via the user A's virtual network 4011 on the virtual network system 1 (101), furthermore, is transferred to the packet processing unit 114 via the user A's virtual network 4021 on the virtual network system 2 (111), is distributed to each user by the packet input/output part 408 of the packet processing unit 114, and is transferred to the packet processing part 1 (4071). Conversely, the communication packet from the packet processing part 1 (4071) assigned to the user A is transmitted to the virtual network system 2 (111) from the packet input/output part 408, is transferred to the virtual network relay processing unit 113 via the user A's virtual network 4021 on the virtual network system 2 (111), and is transferred to the user A base 10412 via the user A's virtual network 4011 on the virtual network system 1 (101).

Next, constituents of the virtual network management server 115 will be explained. A service request reception part 410 receives a use request of the communication service or a packet processing service from the user. A virtual network system 1 management part 413 performs creation of the users' virtual networks 4011, 4012, . . . , alteration of their configurations, and deletion of them on the virtual network system 1 (101) by the use request of the communication service from the user that the service request reception part 410 received. Moreover, it preserves topology information, configuration information, and setup information of the core router 102 and the edge router 103 of the virtual network system 1 (101) as virtual network system 1 management information 417.

By the use request of the packet processing service from the user that the service request reception part 410 received, a packet processing unit management part 411 perform determination of the packet processing parts 4071, 4072, . . . , creation and deletion of the packet processing parts 4071, 4072, . . . , and assignment and assignment cancellation thereof to the user on the packet processing unit 114 that is assigned to the user. Moreover, the packet processing unit management part 411 holds information of an installation site of the packet processing unit 114, the configuration information, and the setup information in packet processing unit management information 416, and holds user assignment information of the packet processing parts 4071, 4072, . . . in user management information 415.

A virtual network system 2 management part 414 performs creation of the virtual networks 4021, 4022, . . . on a virtual network 2 (111), alteration of the configuration, and deletion thereof by the use request of the packet processing service from the user that the service request reception part 410 received. Moreover, it preserves the topology information, the configuration information, and the setup information of the core router 112 of the virtual network system 2 (111) as virtual network system 2 management t information 418. A virtual network relay processing unit management part 412 analyzes a correspondence relationship between the user's virtual network system 1 user identifier and the virtual network system 2 user identifier by the use request of the packet processing service from a user that the service request reception part 410 received, and sets the virtual network relay processing unit 113 so that a user's packet may be able to be relayed between the virtual network system 1 (101) and the virtual network system 2 (111). Moreover, it holds correspondence information between the user's virtual network system 1 user identifier and the user's virtual network system 2 user identifier in the user management information 415.

FIG. 7 shows the user management information 415 that is shown in a table form and is made up of, at least, a user identifier K701 that is a user name used for managing the users in the whole communication system or is an identifier thereof, a virtual network system 1 user identifier K702 for identifying the communication packet for each user in the virtual network system 1 (101), a virtual network system 2 user identifier K703 for identifying the communication packet for each user in the virtual network system 2 (111), an identification number K704 for identifying the packet processing unit 114, and a packet processing part number K705 for identifying the packet processing parts 4071, 4072, . . . in the packet processing unit 114.

Next, as a method for controlling the communication system of this embodiment, a method for assigning the packet processing parts 4071, 4072, . . . to the users and a method for transferring the communication packet in the virtual network system 1 (101), the virtual network relay processing unit 113, and the packet processing unit 114 will be explained.

Figure 8:
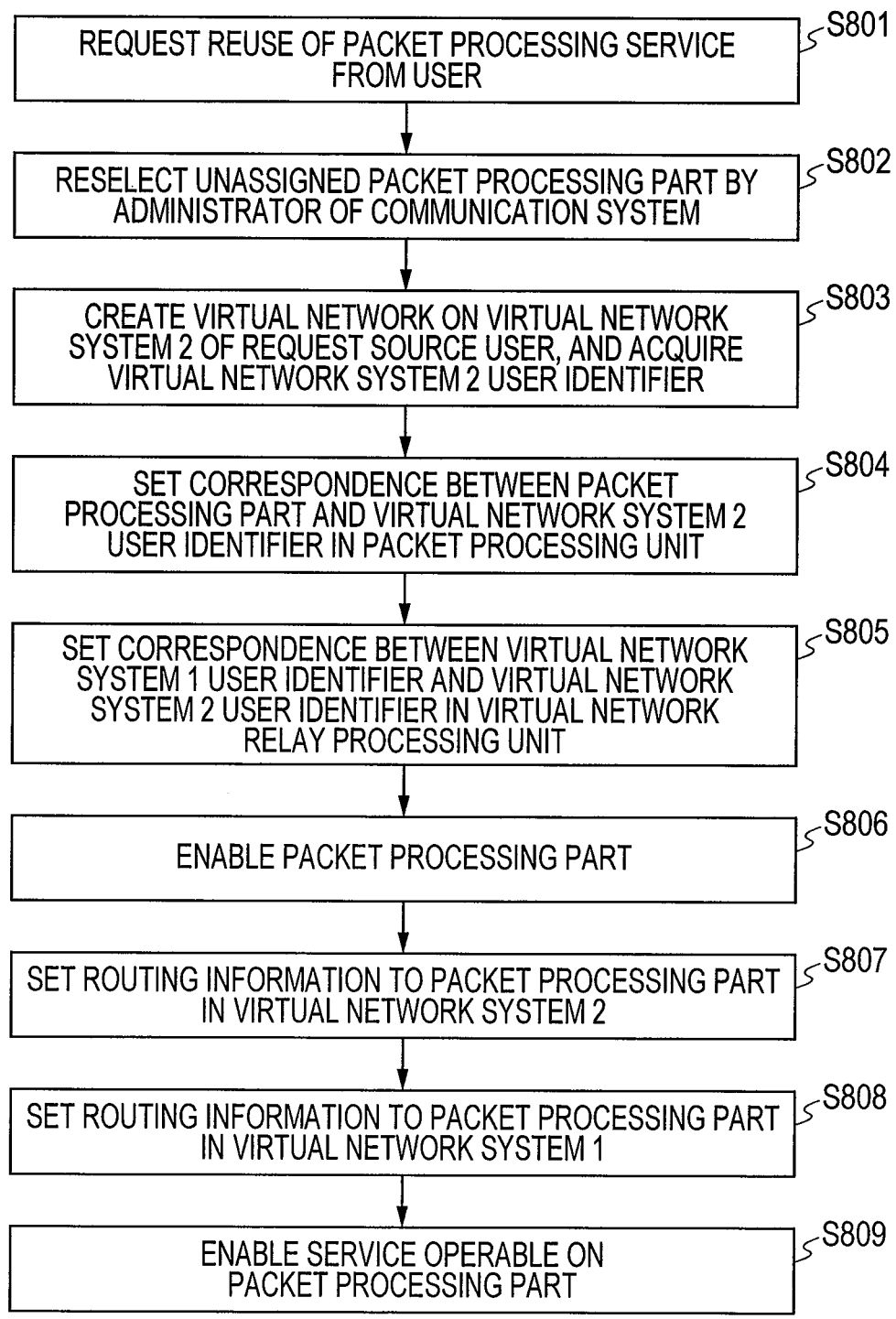
FIG. 8 is a flowchart showing one example of a method for assigning a packet processing part to a user (the first thereof)

First, a method for assigning the packet processing parts 4071, 4072, . . . to the user will be described using FIG. 8. FIG. 8 is a flowchart showing one example of a method for assigning the packet processing part to the user according to the first form of implementation. As shown in FIG. 8, upon reception of the use request of the packet processing service from the user, an administrator of the communication system issues the use request of the packet processing service to the service request reception part 410 of the virtual network management server 115 (Step S801). The packet processing unit management part 411 of the virtual network management server 115 refers to the packet processing unit management information 416, and displays the packet processing parts 4071, 4072, . . . that are not used in the communication system. To the service request reception part 410, the administrator of the communication system selects one of the packet processing parts 4071, 4072, . . . that is to be assigned to the user (Step S802).

The virtual network system 2 management part 414 of the virtual network management server 115 creates users' virtual networks 4021, 4022, . . . on the virtual network system 2 (111) so that a user's information system base 104 may be able to communicate with the packet processing part 4071, 4072, . . . that was assigned to the user. Moreover, it registers the virtual network system 2 user identifiers of the virtual networks 4021, 4022, . . . that were assigned to the users in the user management information 415 (Step S803). The packet processing unit management part 411 sets the packet processing parts 4071, 4072, . . . that were assigned to the users and the virtual network system 2 user identifier in the packet processing part assignment information 409 of the packet processing unit 114. Moreover, it registers the packet processing parts 4071, 4072, . . . that were assigned to the users and the virtual network system 2 user identifier in the user management information 415 (Step S804).

The virtual network relay processing unit management part 412 of the virtual network management server 115 refers to the user's virtual network system 1 user identifier from the virtual network system 1 management information 417, and sets the user's virtual network system 1 user identifier and the virtual network system 2 user identifier in the virtual network relay information 406 of the virtual network relay processing unit 113. Moreover, it registers the virtual network system 1 user identifier in the user management information 415 (Step S805).

The packet processing unit management part 411 enables the packet processing parts 4071, 4072, . . . in order to perform initial setup of the packet processing parts 4071, 4072, . . . (Step S806). In order to make it possible to transfer the communication packets to the packet processing parts 4071, 4072, . . . that have been assigned to the users in the virtual network system 2 (111), the packet processing unit management part 411 sets routing information to the core router 112, the packet processing unit 114, and the virtual network relay processing unit 113 (Step S807). The setup of the routing information here differs depending on a transport technology used in the virtual network system 2 (111). As such methods, there are: a method whereby a virtual management server 115 sets the routing information fixedly (a fixed method); a method whereby pieces of firmware mounted on the core router and the edge router that constitute the virtual network system communicate with one another and set the routing information autonomously (an autonomous method); a method whereby a transmission source of the communication packet inquires a destination of the core router and the edge router in the virtual network at the time of beginning of communication and sets the routing information (an inquiry method); etc. Any one will do in this embodiment.

Next, in order to make it possible to transfer the communication packet to the packet processing parts 4071, 4072, . . . that have been assigned to the users in the virtual network system 1 (101), the setup of the routing information is performed on the core router 102, the edge router 103, and the virtual network relay processing unit 113 (Step S808). Although the setup of the routing information becomes different depending on the transport technology used in the virtual network system 1 (101) like the above-mentioned setup of the routing information of the virtual network system 2, any one of the fixed method, the autonomous method, the inquiry method, etc. may be used in this embodiment. Finally, the packet processing unit management part 411 enables an operation of the packet processing function on the packet processing parts 4071, 4072, . . . that have been assign to the users to start a service, making the packet processing function available to the users (Step S809).

Next, using FIG. 9 and FIG. 10, a method for transferring the communication packet among the user bases 104 using the virtual network system 1 (101) will be explained. FIG. 9 is an explanatory diagram showing one example of a format of the communication packet at the user base according to the first form of implementation of the present invention, and FIG. 10 is an explanatory diagram showing one example of the format of the communication packet in the virtual network system 1 according to the first form of implementation of the present invention.

As shown in FIG. 9, the communication packets in the user A bases 10411, 10412 use a standard Ethernet format. A communication packet 901 is in a packet format in the case of not using Tag-VLAN, and consists of a destination address (DA), a transmission source address (SA), a user's data frame (User Frame), and error checking data (FCS). Moreover, a communication packet 902 is in a packet format in the case of using the Tag-VLAN, which is a format of the communication packet 901 with what shows the kind of tag (Type) and VLAN ID (VID) added as a VLAN tag. On the other hand, in the virtual network system 1 (101), the transport technology that is identifiable for each user is used in order to provide the virtual networks 4011, 4012, . . . for respective users. Although in this embodiment, a case where MPLS (Multi-Protocol Label Switching) is used as the transport technology of the virtual network system 1 (101), other technology may be used as the transport technology.

As shown in FIG. 10, a communication packet 1001 of the MPLS consists of the destination address (DA), the transmission source address (SA), and what shows the kind of tag (Type), MPLS headers (MPLS1, MPLS2), the user's data frame (User Frame), the error checking data (FCS). The MPLS header 1002 consists of ID (Lavel) for identifying the virtual network, priority (EXP) of a processing, information (S) showing continuation of a label, and information (TTL) showing a life of the frame. In order to identify the user within the virtual network system 1 (101), discrimination is performed by attaching an identifier whereby the user is discriminated, that is, the virtual network system 1 user identifier to the ID for identifying the virtual network in the MPLS header 1002.

When transferring the communication packet to the user A base 10412 from the user A base 10411 of FIG. 4, the communication packet 901 or communication packet 902 of the user A base 10411 is subjected to conversion of encapsulation into a format of the communication packet 1001 so that the edge router 103 connecting the user A base 10411 and the virtual network system 1 (101) can transfer it in the virtual network system 1 (101). The edge router 103 holds information of a user A's virtual network system 1 user identifier (ID=1), adds the user A's virtual network system 1 user identifier (ID=1) to the communication packet 1001, and transfers it to the virtual network system 1 (101). Since the communication packet 1001 is added with the virtual network system 1 user identifier (ID=1), it is transferred using the user A's virtual network 4011 within the virtual network system 1 (101), and is sent to the edge router 103 connected to the user A base 10412 of its destination. The edge router 103 converts the format of the communication packet 1001 into the format of the communication packet 901 or communication packet 902 by canceling the encapsulation.

In this way, the communication packet is transferred from the user A base 10411 of the transmission source to the user A base 10412 of a transmission destination. Incidentally, when the communication packet is transferred from the user A base 10411 of the transmission source to the virtual network relay processing unit 113, the edge router 103 transfers the communication packet 1001 of the virtual network system 1 obtained by encapsulating the communication packet 901 or communication packet 902 to the virtual network relay processing unit 113.

Figure 11:
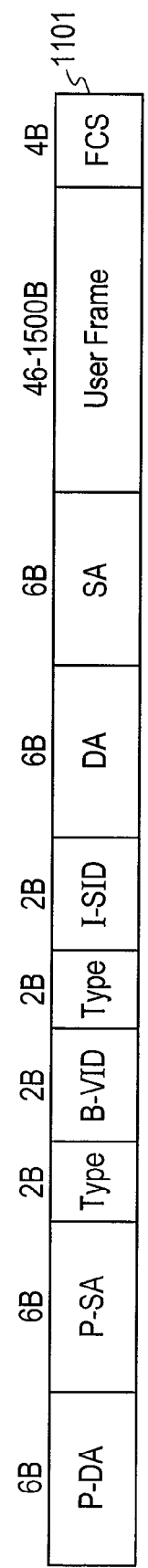
FIG. 11 is an explanatory diagram showing one example of a format of the communication packet in a virtual network system 2.
Figure 12:
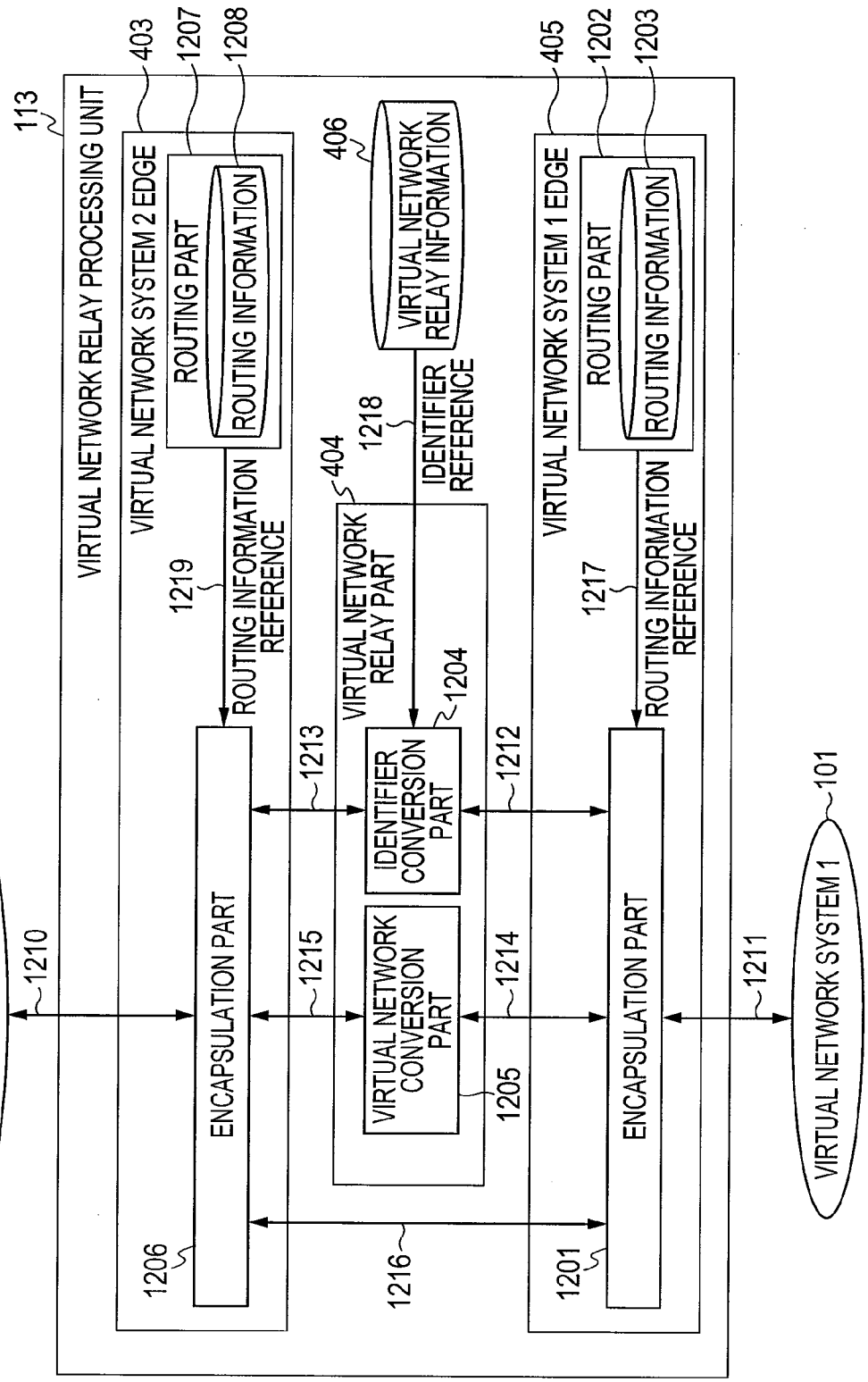
FIG. 12 is an explanatory diagram showing one example of a functional block of a virtual network relay processing unit.
Figure 13:
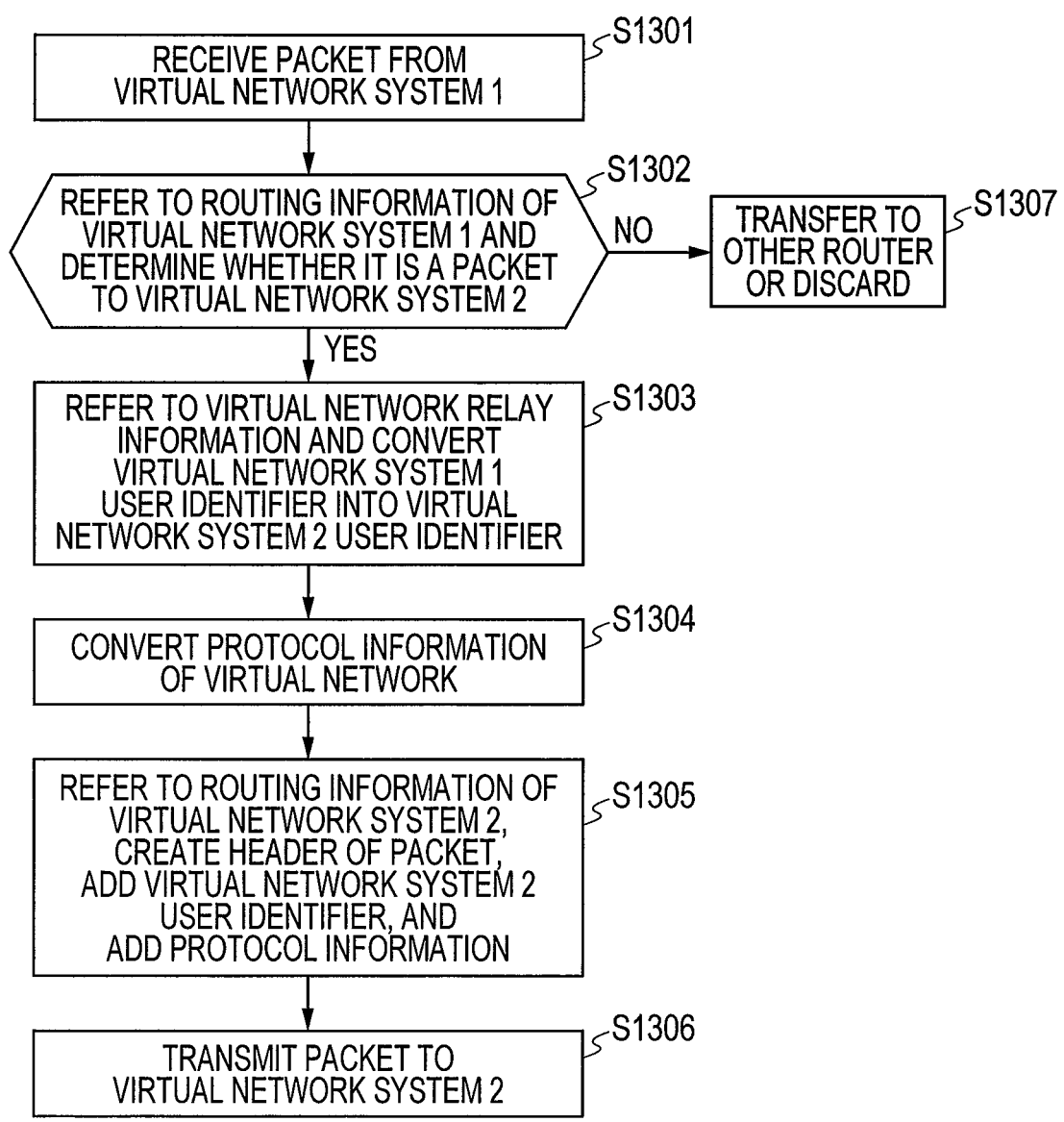
FIG. 13 is a flowchart showing one example of a method for transferring the communication packet of the virtual network relay processing unit.

Next, using FIG. 10, FIG. 11, FIG. 12, and FIG. 13, a method for relaying the communication packet by the virtual network relay processing unit 113 will be explained. FIG. 11 is an explanatory diagram showing one example of the format of the communication packet in the virtual network system 2 according to the first form of implementation of the present invention. FIG. 12 is an explanatory diagram showing one example of a functional block of the virtual network relay processing unit according to the first form of implementation of the present invention. FIG. 13 is a flowchart showing one example of a method for transferring the communication packet of the virtual network relay processing unit according to the first form of implementation of the present invention.

In the virtual network system 1 (101), a case where the MPLS same as what was described above, that is, the communication packet format shown in FIG. 10 is used is shown. Similarly, also in the virtual network system 2 (111), in order to provide the virtual networks 4021, 4022, . . . to respective users, the transport technology that is identifiable to each user is used for the each user. In this embodiment, the case where PBB-TE (Provider Backbone Bridging-Traffic Engineering) is used as the transport technology of the virtual network system 2 (111) is shown. As for the transport technology, other technologies may be used.

As shown in FIG. 11, the communication packet 1101 of the PBB-TE consists of: a destination address (P-DA) in the virtual network system 2 (111); a transmission source address (P-SA) in the virtual network system 2 (111); information showing the kind of tag (Type); an ID for identifying the virtual network in the virtual network system 2 (111); information showing priority (B-VID, I-SID); the destination address (DA), the transmission source address (SA); the user's data frame (User Frame); and the error checking data (FCS). In order to discriminate the user in the virtual network system 2 (111), discrimination is performed by adding an identifier for discriminating the user, that is, the virtual network system 2 user identifier to the ID for identifying the virtual network in the virtual network system 2 (111) and the information showing the priority (B-VID, I-SID).

Next, a detailed configuration of a functional block of the virtual network relay processing unit 113 will be explained using FIG. 12. As described above, the virtual network relay processing unit 113 consists of several large functional blocks: the virtual network system 1 edge 405, the virtual network system 2 edge 403, the virtual network relay part 404, and the virtual network relay information 406.

The virtual network system 1 edge 405 has an encapsulation part 1201 that performs encapsulation and cancellation of the encapsulation of the communication packet into/from the packet format within the virtual network system 1 (101) and performs transmission/reception of the communication packet to/from the virtual network system 1 (101), and a routing part 1202 for holding routing information 1203 of the communication packet in the virtual network system 1 (101). The encapsulation part 1201 refers to the routing information (1217), determines whether the communication packet is transferred to the virtual network system 2 (111), and adds transfer information in the virtual network system 1 (101) to the communication packet. Similarly the virtual network system 2 edge 403 has an encapsulation part 1206 that performs encapsulation and cancellation of encapsulation of the communication packet into/from the packet format within the virtual network system 2 (111) and performs transmission/ reception of the communication packet to/from the virtual network system 2 (111), and a routing part 1207 for holding routing information 1208 of the communication packet in the virtual network system 2 (111). The encapsulation part 1206 refers to routing information (1219), determines whether the communication packet is to be transferred to the virtual network system 1 (101), and adds transfer information in the virtual network system 2 (111) to the communication packet.

Relaying of the communication packet between the virtual network system 1 (101) and the virtual network system 2 (111) is performed by the virtual network relay part 404. An identifier conversion part 1204 of the virtual network relay part 404 performs the following: in the case of relaying the communication packet from the virtual network system 1 (101) to the virtual network system 2 (111), receiving the virtual network system 1 user identifier in the communication packet from the encapsulation part 1201 of the virtual network system 1 edge 405 (1212), referring to the virtual network system 2 user identifier corresponding to this virtual network system 1 user identifier from virtual network system relay information 406 (1218), and notifying the virtual network system 2 user identifier to the encapsulation part 1206 of the virtual network system 2 edge 403 (1213).

Moreover, a virtual network conversion part 1205 of the virtual network relay part 404 performs the following: in the case of relaying the communication packet from the virtual network system 1 (101) to the virtual network system 2 (111), receiving, for example, priority information of transfer, path information of the packet, etc. from the encapsulation part 1201 of the virtual network system 1 edge 405 as protocol information in the communication packet (1214), converting it into a format compatible with a packet format within the virtual network system 2 (111), and notifying the virtual network system 2 user identifier to the encapsulation part 1206 of the virtual network system 2 edge 403 (1215). Incidentally, in the case of relaying the communication packet from the virtual network system 2 (111) to the virtual network system 1 (101), the processing becomes a totally reverse processing and its explanation will be omitted. Moreover, a portion that is not required to be converted between the virtual network system 1 (101) and the virtual network system 2 (111), such as user data in the communication packet, is relayed between the encapsulation part 1201 of the virtual network system 1 edge 405 and the encapsulation part 1206 of the virtual network system 2 edge 403 (1216). Incidentally, in both of the identifier conversion part 1204 and the virtual network conversion part 1205, in a case of relaying the communication packet from the virtual network system 2 (111) to the virtual network system 1 (101), since the processing becomes a totally reverse processing, its explanation will be omitted.

Next, a method for relaying the user A's communication packet from the virtual network system 1 (101) to the virtual network system 2 (111) will be described using FIG. 13.

The virtual network system 1 edge 405 of the virtual network relay processing unit 113 receives the communication packet 1001 in an MPLS format shown in FIG. 10 from the user A's virtual network 4011 of the virtual network system 1 (101) (Step S1301). The encapsulation part 1201 of the virtual network system 1 edge 405 determines whether the destination of the communication packet 1001 is the virtual network system 2 (111) by referring to routing information 1203 (Step S1302). Here, when the destination is not the virtual network system 2 (111), the communication packet 1001 is transferred to other router, or is discarded (Step S1307).

When the destination of the communication packet 1001 is the virtual network system 2 (111), the encapsulation part 1201 extracts the user A's virtual network system 1 user identifier (ID=1) from ID (Lavel) for identifying the virtual network of the communication packet 1001 of the virtual network system 1 (101). The identifier conversion part 1204 refers to the virtual network relay information 406, acquires the virtual network system 2 user identifier (ID=10) corresponding to the virtual network system 1 user identifier (ID=1), and notifies it to the virtual network system 2 edge 403 (Step S1303). Moreover, the encapsulation part 1201 extracts the priority information, for example, from the priority (EXP) of processing of the communication packet 1001 of the virtual network system 1 (101). The virtual network conversion part 1205 performs protocol conversion so that the extracted priority information can be used in the virtual network system 2 (111), and informs it to the virtual network system 2 edge 403 (Step S1304).

The virtual network system 2 edge 403 refers to the routing information 1208 and creates the communication packet 1101 of the virtual network system 2 (111). Moreover, the virtual network system 2 edge 403 adds the virtual network system 2 user identifier (ID=10) and the priority information to the ID whereby the virtual network within the virtual network system 2 (111) of the communication packet 1101 in the virtual network system 2 (111) is identified and the information (B-VID, I-SID) showing the priority (Step S1305). The virtual network system 2 edge 403 transmits the created communication packet 1101 to the virtual network system 2 (111) (Step S1306).

Figure 14:
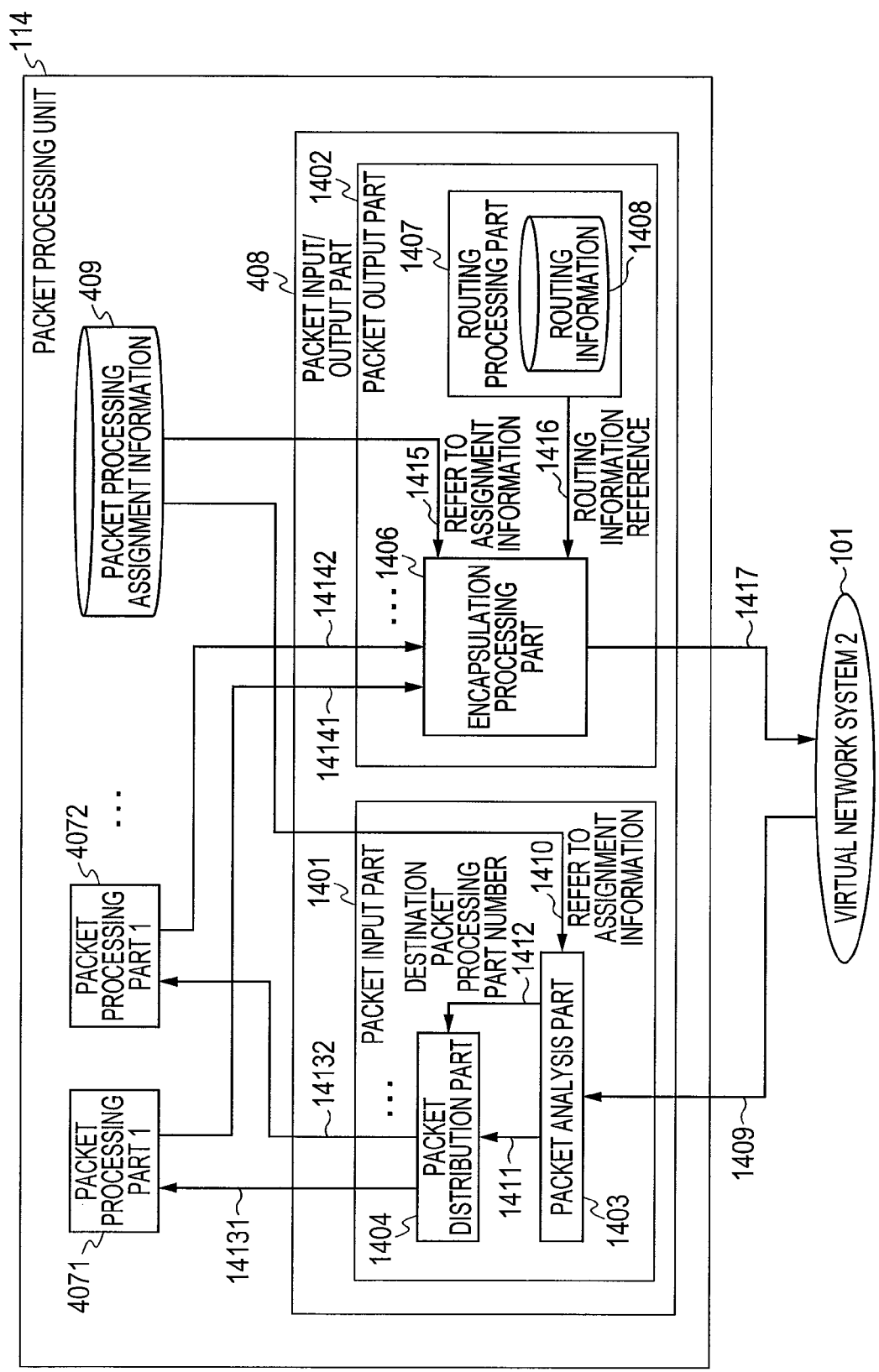
FIG. 14 is an explanatory diagram showing one example of a functional block of the packet processing unit.

Next, using FIG. 11 and FIG. 14, a method for transmitting and receiving the communication packet in the packet processing unit 114 will be explained. FIG. 14 is an explanatory diagram showing one example of a functional block of the packet processing unit according to the first form of implementation of the present invention. Shown is a case where PBB-TE same as described above, that is, the communication packet format shown in FIG. 11 is used as the transport technology in the virtual network system 2 (111). Below, the case of the user A's communication packet when a packet processing part 14071 is assigned to the user A will be explained as one example of the method for transmitting/receiving the communication packet. As shown in FIG. 14, the packet processing unit 114 consists of the packet processing parts 4071, 4072, . . . , the packet input/output part 408, and the packet processing part assignment information 409, as described above. The packet input/output part 408 consists of a packet input part 1401 and a packet output part 1402. Below, methods for inputting or outputting the communication packet will be described, respectively.

First, the following will describe the case where the communication packet inputs into the packet processing unit 114. The packet input part 1401 receives the communication packet 1101 in the PBB-TE format shown in FIG. 11 from the virtual network system 2 (101) via an interface 1409. A packet analysis part 1403 of the packet input part 1401 extracts a user A's virtual network system 2 user identifier (ID=10) from the ID for identifying the virtual network in the virtual network system 2 (111) and the information showing the priority (B-VID, I-SID) by analyzing the received communication packet 1101. The packet analysis part 1403 refers to the packet processing part assignment information 409 (1410), and supports the virtual network system 2 user identifier (ID=10), that is, determines the packet processing part number (ID=1) assigned to the user A.

A packet distribution part 1404 receives a communication packet 1411 and a packet processing part number 1412 (ID=1) of its destination from the packet analysis part 1403, and transfers the communication packet 1101 to the packet processing part 1 (4071) (14131). Here, regarding the communication packet 1101 to be transferred to the packet processing part 1 (4071), the whole communication packet shown in FIG. 11 may be transferred, and only the user's data frame (User Frame) thereof may be transferred. The packet processing part 1 (4071) receives the communication packet 1101 and, for example, performs packet processings, such as a monitoring function of the communication packet and a cache function of the communication packet.

Next, a case where the communication packet is outputted from the packet processing unit 114 will be described. When outputting the communication packet, the packet processing part 1 (4071) serves as the transmission source of the communication packet. The packet processing part 1 (4071) creates the communication packet to be transmitted, and transmits it to the packet output part 1402 (14141). Upon reception of the communication packet from the packet processing part 1 (4071), an encapsulation part 1406 of the packet output part 1402 refers to routing information 1408 of the virtual network system 2 (101) from a routing part 1407 (1416), and creates the communication packet in a format of PBB-TE shown in FIG. 11 in the virtual network system 2 (101). Moreover, the encapsulation part 1406 refers to virtual network system 2 user identifier in the virtual network system 2 (101) corresponding to the packet processing part 1 (4071), that is, the user A's virtual network system 2 user identifier (ID=10) from the packet processing part assignment information 409 (409). The encapsulation part 1406 adds the virtual network system 2 user identifier (ID=10) to the ID whereby the virtual network within the virtual network system 2 (111) of the communication packet 1101 is identified and the information (B-VID, I-SID) showing the priority. The packet output part 1402 transmits the created communication packet 1101 to the virtual network system 2 (111) (1409).

By using such a method for transferring the communication packet, the user A's communication packet is transferred from the user A base 10411 to the packet processing part 1 (4071) that is assigned to the user A and becomes a destination via the user A's virtual network 4011, the virtual network relay processing unit 113, the user A's virtual network 4021, and the packet processing unit 114, respectively.

As described above, in the first embodiment of the present invention, the virtual network management server 115 manages the user identifier K701, the virtual network system 1 user identifier K702, the virtual network system 2 user identifier K703, and the identification number K704 and the packet processing part number K705 of the packet processing unit as the user management information 415, and sets the packet processing part assignment information 409 of the packet processing unit 114 and the virtual network relay information 406, which makes it possible to perform communications between the user base 104 and the packet processing parts 4071, 4072, . . . using the virtual networks that are separated for respective users.

Second Embodiment

Hereafter, a communication system according to a second form of implementation of the present invention will be described. The communication system according to the second embodiment is the same as the communication system according to the first embodiment shown in FIG. 1 except that physical configurations of the packet processing unit 114 and the device shown in FIG. 3 are different from those of the first embodiment. Therefore, only portions that are different from those of the first embodiment will be explained, and explanations of the same parts will be omitted.

Figure 15:
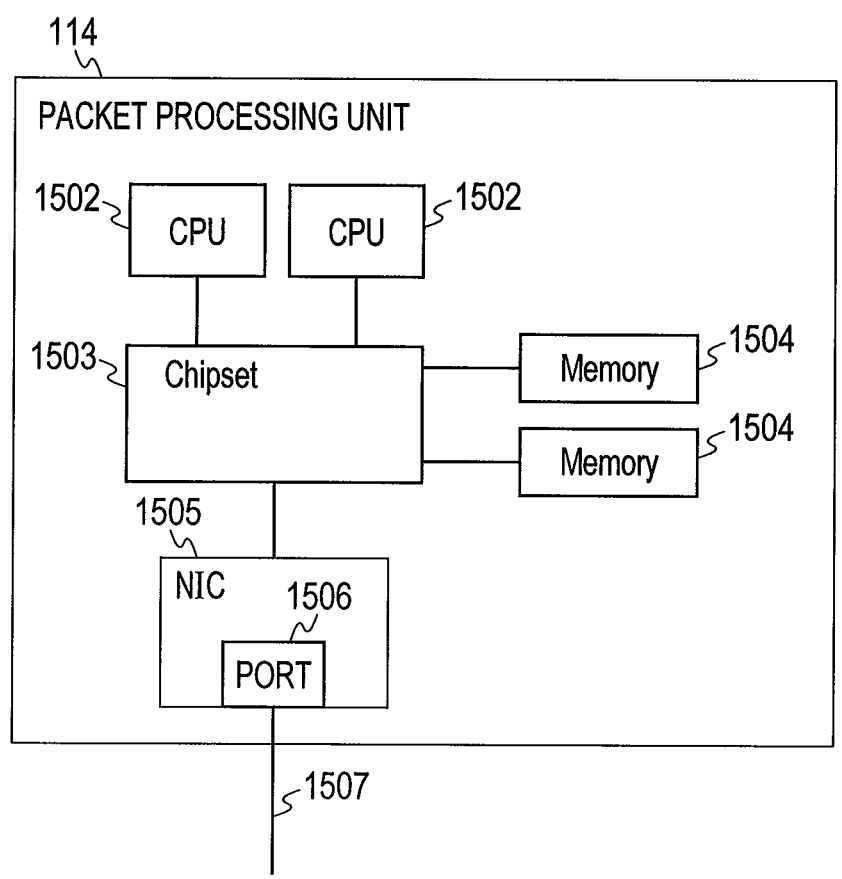
FIG. 15 is a block diagram of a physical configuration of the packet processing unit of the communication system (the second thereof)

A physical configuration of the packet processing unit 114 in this embodiment will be explained using FIG. 15. FIG. 15 is a block diagram of the physical configuration of the packet processing unit of the communication system according to the second form of implementation. As shown in FIG. 15, the packet processing unit 114 of this embodiment assumes a configuration of a typical computer architecture, for example, Intel architecture. The packet processing unit 114 is constructed with a general purpose processor (CPU) 1502, memory (Memory) 1504, a network interface card 1505, and a chip set (Chipset) 1503 that internally connects them mutually. The network interface card 1505 is equipped with a communication port (PORT) 1506 of an interface for connecting to other unit with communication cable 1507.

Figure 25:
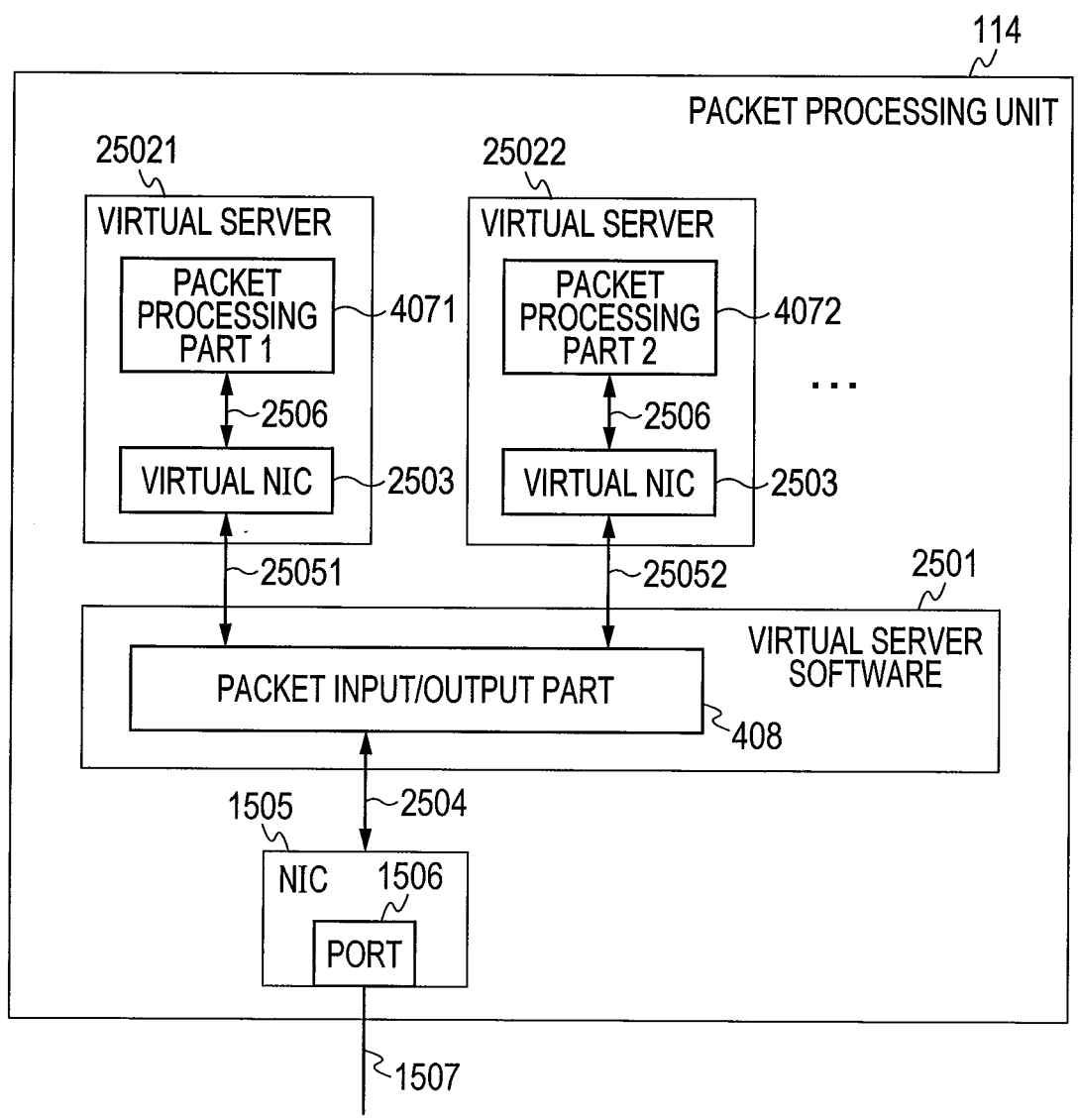
FIG. 25 is a block diagram showing one example of a functional block of the packet processing unit of the communication system.

Next, a functional block configuration in the packet processing unit 114 of FIG. 15 will be explained using FIG. 25. FIG. 25 is a block diagram showing one example of the functional block of the packet processing unit of the communication system according to the second form of implementation. As shown in FIG. 25, in the packet processing unit 114 of the second embodiment, it is possible to create a plurality of virtual servers 25021, 25025 by using virtual server software 2501, for example, KVM (Kernel-based Virtual Machine) on the packet processing unit 114, and for a plurality of users to share the packet processing unit 114 by making the packet processing parts 4071, 4072, . . . for each user operate on the virtual server 2501.

An input packet inputted into the packet processing unit 114 from the communication cable 1507 is transferred to the packet input/output part 408 in the virtual server software 2501 via the communication port 1506 of the network interface card 1505 (2504). The packet input/output part 408 determines which packet processing part is the destination of the input packet, the packet processing part 4071 or 4072, and transfers the input packet to a virtual network interface card 2503 of a virtual server 2502 that becomes the destination (25051, 25052). For example, when the destination is the packet processing part 14071, it transfers the input packet to the virtual network interface card 2503 of the virtual server 25021 containing the packet processing part 14071 (25051). The packet inputted into the virtual network interface card 2503 is transferred to the packet processing parts 4071, 4072, . . . . Conversely, when the packet is outputted to the outside of the packet processing unit 114 from the packet processing parts 4071, 4072, . . . , the output packets from the packet processing parts 4071, 4072, . . . are transferred to the virtual network interface card 2503 (2506), and are also transferred to the packet input/output part 408 in the virtual server software 2501 (25051, 25052). The packet input/output part 408 performs a processing on the output packet so that the output packet may be able to be transferred in the virtual network system 2 (101). This processing is the same as in the first embodiment. The packet input/output part 408 transfers the output packet to a network outside the packet processing unit 114 (1507) via the network interface card 1505 (2504).

Third Embodiment

Figure 16:
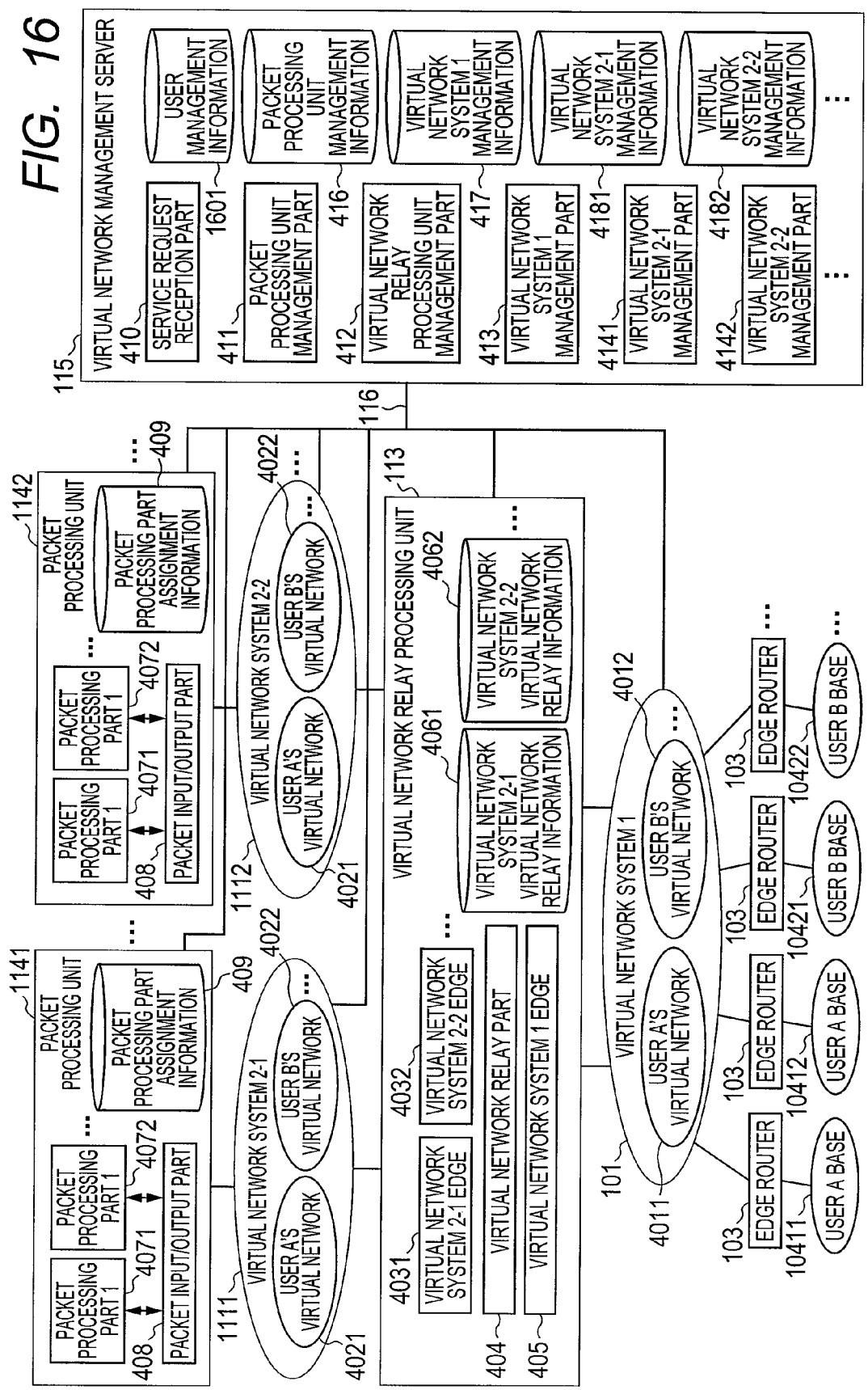
FIG. 16 is a block diagram of a logical configuration of the communication system (the second thereof)

Next, a communication system according to a third form of implementation of the present invention will be explained. The communication system according to the third embodiment is the same as the communication system of the first embodiment shown in FIG. 4 except that its logical configuration is different from that of the first embodiment. Therefore, below, only different parts from the first embodiment will be explained, and explanations of the same parts will be omitted. The logical configuration of the communication system in this embodiment will be explained using FIG. 16 and FIG. 17. FIG. 16 is a block diagram of the logical configuration of the communication system according to the third form of implementation, and FIG. 17 is an explanatory diagram showing one example of the user management information according to the third form of implementation.

As shown in FIG. 16, the logical configuration of the communication system in the third embodiment is such that a plurality of virtual network systems, i.e., a virtual network system 2-1 (1111), a virtual network system 2-2 (1112), . . . are connected to the virtual network relay processing unit 113. Like in the first embodiment, a plurality of packet processing units 1141, 1142, . . . are connected to the respective virtual network systems: the virtual network system 2-1 (1111), the virtual network system 2-2 (1112), . . . . Therefore, the configuration of the virtual network relay processing unit 113 is different from that of the first embodiment of FIG. 4 in a virtual network system 2-1 edge 4031, a virtual network system 2-2 edge 4032, . . . for the virtual network system 2-1 (1111), the virtual network system 2-2 (1112), . . . , respectively, and virtual network relay information 4061 for the virtual network system 2-1, virtual network relay information 4062 for the virtual network system 2-2, . . . thereof. However, functions of the virtual network system 2-1 edge 4031, the virtual network system 2-2 edge 4032, . . . are the same as in the first embodiment. Pieces of information of the virtual network relay information 4061 for the virtual network system 2-1, the virtual network relay information 4062 for the virtual network system 2-2, . . . are the same as in the first embodiment.

Moreover, the configuration of the virtual network management server 115 is different from that of the first embodiment of FIG. 4 in a virtual network system 2-1 management part 4141, a virtual network system 2-2 management part 4142, . . . for the virtual network system 2-1 (1111), the virtual network system 2-2 (1112), . . . , respectively, virtual network system 2-1 management information 4181, virtual network system 2-2 management information 4182, . . . thereof, respectively, and user management information 1601. However, functions of the virtual network system 2-1 management part 4141, the virtual network system 2-2 management part 4142, . . . are the same as in the first embodiment. Moreover, pieces of information of the virtual network system 2-1 management information 4181, the virtual network system 2-2 management information 4182, . . . are the same as in the first embodiment.

FIG. 17 is the user management information 1601 that is shown in a table form, and as compared with the user management information 415 of the first embodiment of FIG. 7, the user management information 1601 is added with information of a virtual network system 2-1 user identifier K7031, a virtual network system 2-2 user identifier K7032, . . . of the virtual network system 2-1 (1111), the virtual network system 2-2 (1112), . . . , respectively.

According to this embodiment, when there is a limit to the number of the packet processing units 114 connectable to the virtual network system 2 (111), it becomes possible to increase the number of connectable packet processing units 114 by a configuration that makes it possible to construct a plurality of virtual network systems: the virtual network system 2-1 (1111), the virtual network system 2-2 (1112), . . . .

Fourth Embodiment

Figure 18:
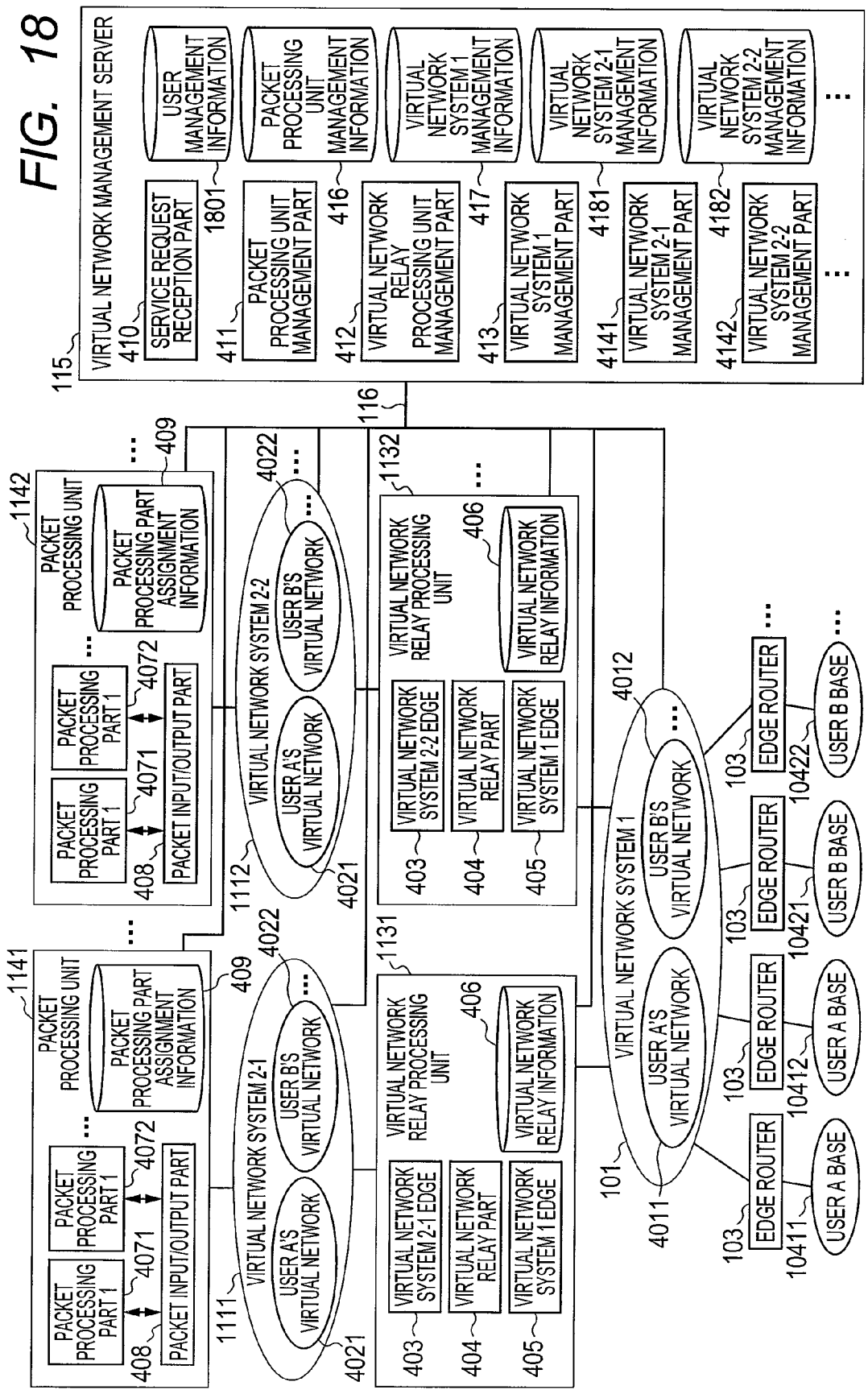
FIG. 18 is a block diagram of a logical configuration of the communication system (the third thereof)

Next, a communication system according to a fourth embodiment of the present invention will be explained. The communication system according to the fourth embodiment is the same as the communication system of the first embodiment shown in FIG. 4 except that its logical configuration is different from that thereof. Therefore, below, only different portions that are different from those of the first embodiment will be explained, and explanations for the same portions will be omitted. The logical configuration of the communication system in this embodiment will be explained using FIG. 18 and FIG. 19. FIG. 18 is a block diagram of the logical configuration of the communication system according to the fourth form of implementation of the present invention, and FIG. 19 is an explanatory diagram showing one example of the user management information according to the fourth form of implementation.

As shown in FIG. 18, the logical configuration of the communication system in the fourth embodiment is such that a plurality of virtual network relay processing units 1131, 1132, . . . are connected to the virtual network system 1 (101). The virtual network system 2-1 (1111), the virtual network system 2-2 (1112), . . . are connected to the respective virtual network relay processing units 1131, 1132, . . . . Like the first embodiment, the plurality of packet processing units 1141, 1142, . . . are connected to the virtual network system 2-1 (1111), the virtual network system 2-2 (1112), . . . , respectively. Therefore, the configuration of the virtual network management server 115 differs from that of the first embodiment of FIG. 4 in the virtual network system 2-1 management part 4141, the virtual network system 2-2 management part 4142, . . . for the virtual network system 2-1 (1111), the virtual network system 2-2 (1112), . . . , respectively, virtual network system 1 management information 4181, virtual network system 2 management information 4182, . . . , and user management information 1801. However, functions of the virtual network system 2-1 management part 4141, the virtual network system 2-2 management part 4142, . . . are the same as in the first embodiment.

Moreover, pieces of information of the virtual network system 2-1 management information 4181, the virtual network system 2-2 management information 4182, . . . are the same as in the first embodiment.

FIG. 19 is user management information 1801 that is shown in a table form: it is added with information of the virtual network system 2-1 user identifier K7031, the virtual network system 2-2 user identifier K7032, . . . for the virtual network system 2-1 (1111), the virtual network system 2-2 (1112), . . . , respectively, as compared with the user management information 415 of the first embodiment of FIG. 7. By this embodiment, it becomes possible to place the packet processing unit 114 that is away in distance by placing the virtual network relay processing units 1131, 1132, . . . away from the virtual network system 1 (101) in distance.

Fifth Embodiment

Figure 24:
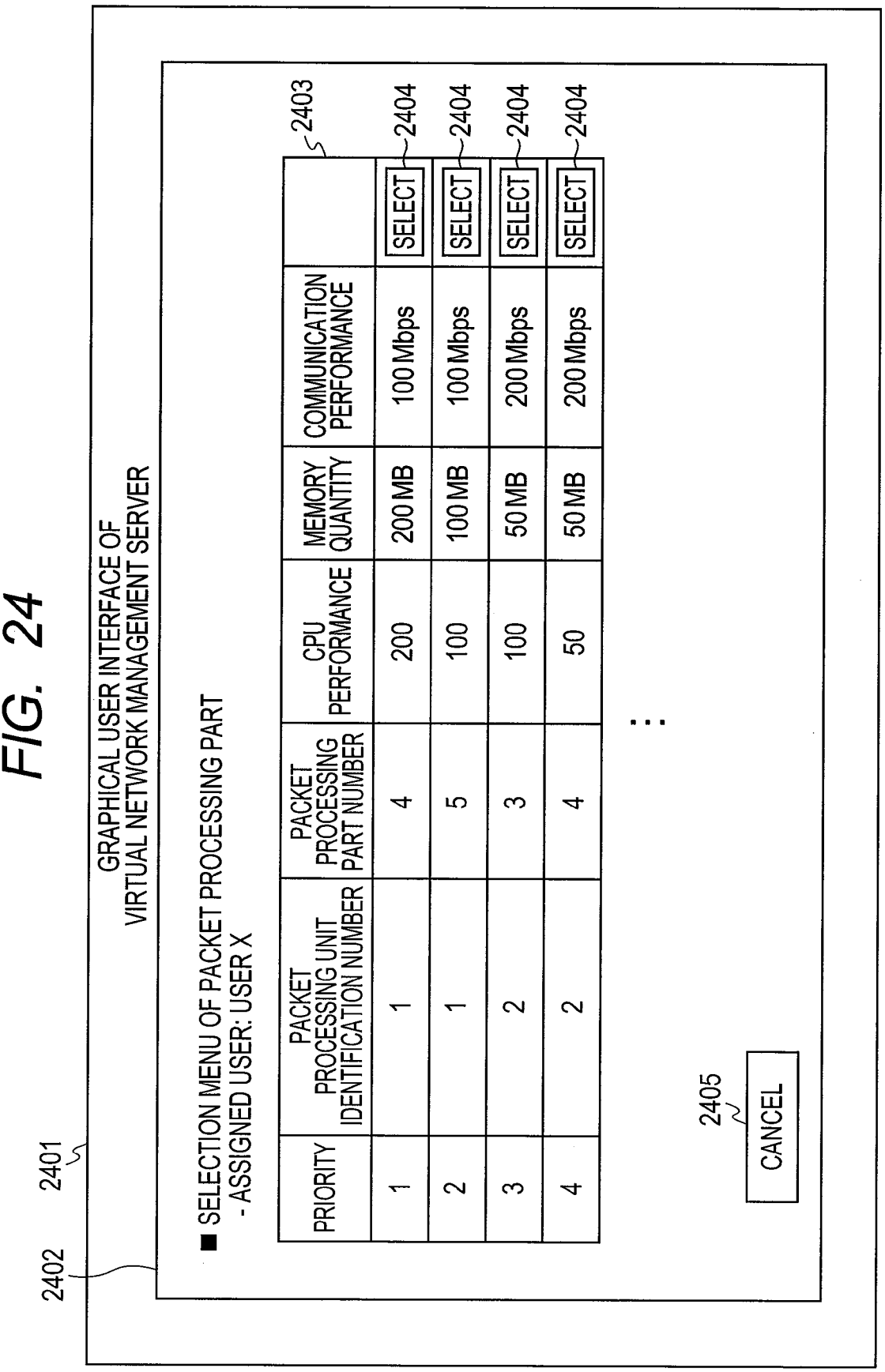
FIG. 24 is an explanatory diagram showing one example of a graphical user interface of a virtual network management server.

Next, a communication system according to a fifth form of implementation of the present invention will be described. The communication system according to the fifth embodiment is basically the same as the communication system according to the first embodiment shown in FIG. 1 except for a difference of a method for assigning the packet processing part to the user shown in FIG. 8. Therefore, below, only different parts from those of the first embodiment will be explained, and explanations for the same parts will be omitted. A method for assigning the packet processing parts to the users of the communication system in this embodiment will be explained using FIG. 20 to FIG. 24. FIG. 20 is a flowchart showing one example of the method for assigning the packet processing part to the user according to the fifth form of implementation, and FIG. 21 is an explanatory diagram showing one example of the packet processing unit management information according to the fifth form of implementation. FIG. 22 and FIG. 23 are explanatory diagrams each showing one example of the intermediate information created by the packet processing unit management part according to the fifth form of implementation, and FIG. 24 is an explanatory diagram showing one example of a graphical user interface of the virtual network management server according to the fifth form of implementation.

As shown in FIG. 20, in a fifth mode of implementation, the assignment method is the method for assigning the packet processing part to the user shown in FIG. 8 further including a step of, when selecting the packet processing part 114 to be assigned to the user, evaluating the priority of assignment from values of the unassigned packet processing part 114, for example, the CPU performance of a packet processing part 114, the memory quantity of the packet processing part 114, communication performance to the packet processing part 114, etc. (Step S2001). The administrator of the communication system selects the packet processing part 114 that is to be assigned to the user from a list of the packet processing parts 114 being put in order of the priority that is indicated by the virtual network management server 115 (Step S802). Incidentally, although the packet processing part 114 is selected manually by the administrator of the communication system in this embodiment, the virtual network management server 115 may select the packet processing part 114 automatically in order of the priority.

In order to evaluate the packet processing part 114 like this, the packet processing unit management information 416 of the virtual network management server 115 includes information shown in FIG. 21. FIG. 21 shows a part of the packet processing unit management information 416 in a table form (2101), which consists of an identification number K2101 for identifying the packet processing unit 114, a packet processing part number K2102 for identifying the packet processing parts 4071, 4072, . . . in the packet processing unit 114, and a user assignment situation K2103 of the packet processing parts 4071, 4072, . . . , wherein specification information of performances of the packet processing parts 4071, 4072, . . . etc. includes, for example, a CPU performance value K2104 available for the packet processing parts 4071, 4072, . . . , a memory quantity K2105 available for the packet processing parts 4071, 4072, . . . , a position of the packet processing unit or packet processing part, and communication performance K2106 among the packet processing parts 4071, 4072, . . . , and the user base 104.

Here, the CPU performance value K2104 is, for example, any of an operating frequency of the CPU or NPU, the number of cores of the CPU or NPU, and a relative performance value of the CPU or NPU (a benchmark value). Incidentally, as the specification information, a pieces of information whereby specifications of the packet processing parts 4071, 4072, . . . except what was mentioned above can be compared may be used. The position of the packet processing unit or packet processing part is information indicating a place where the packet processing unit or packet processing part is installed. The communication performance includes, for example, empty information of a network band of the first virtual network system, empty information of a network band of the second virtual network system, and information showing an actual measurement value of the communication performance to the packet processing unit.

The packet processing unit management part 411 of the virtual network management server 115 performs sorting based on the specification information on a portion of the packet processing parts 4071, 4072, . . . that are unassigned to the users, being found based on packet processing unit management information 2101, and evaluates the priority of user assignment. As shown in FIG. 22 and FIG. 23, the intermediate information obtained by evaluating the priority, which is shown in a table form, consists of priority K2201 that was evaluated, the identification number K2101 for identifying the packet processing unit 114, the packet processing part number K2102 for identifying the packet processing parts 4071, 4072, . . . in the packet processing unit 114, a CPU performance value K2104 available for the packet processing parts 4071, 4072, . . . , the available memory quantity K2105 available for the packet processing parts 4071, 4072, . . . , the communication performance K2106 between the packet processing parts 4071, 4072, . . . and the user base 104.

The intermediate information 2201 obtained by evaluating the priority shown in FIG. 22 is one when the priority is determined based on CPU performance K2104. On the other hand, intermediate information 2301 obtained by evaluating the priority shown in FIG. 23 is one when the priority is determined based on the communication performance K2106 and the CPU performance K2104. The service request reception part 410 of the virtual network management server 115 displays a list of candidates of the packet processing parts 4071, 4072, . . . that are to be assigned to the users from intermediate information with the evaluated priority of FIG. 22 and FIG. 23.

FIG. 24 is an example of a selection menu 2402 of the packet processing part of a graphical user interface 2401 that the virtual network management server 115 provides. The selection menu 2402 of the packet processing part consists of a candidate list in which the packet processing parts 4071, 4072, . . . to be assigned to a user X that was made based on intermediate information 2201, 2301 with the evaluated priority, and a cancel button 2405 for intercepting the selection. Moreover, a candidate list 2403 includes a selection button 2404 for selecting the packet processing parts 4071, 4072, . . . .

In the foregoing, although the invention made by the present inventors was explained concretely based on the forms of implementation, the present invention was not limited to the forms of implementation, but can be modified variously within a range that does not deviate from a gist thereof.

What is claimed is:

1. A communication system for performing relay processing between a first network that includes a plurality of virtual networks whose communication ranges are divided logically and a second network, the communication system comprising:
a network relay processing unit that is connected to the first network and the second network and that has first correspondence information showing a correspondence between a first identifier for identifying a communication packet in the first network and a second identifier for identifying the communication packet in the second network and an identifier conversion part for converting the first identifier for identifying the communication packet based on the first correspondence information; and
a packet processing unit that is connected to the second network and that includes a packet processing part for performing data reference and/or rewrite processing of the communication packet received from the first network, second correspondence information showing a correspondence between the packet processing part and the second identifier, and a packet distribution part for distributing the received communication packet to the packet processing part based on the second correspondence information.

2. The communication system according to claim 1, wherein the network relay processing unit has a network conversion part for converting received communication-packet communication protocol information into a packet format suitable for a transport technology of a network at a relay destination.

3. The communication system according to claim 1, further comprising:
a management server that includes:
a packet processing part that is connected to the network relay processing unit and the packet processing unit and assigns the packet processing part of the packet processing unit to a user;
third correspondence information showing a correspondence between the first identifier for identifying the packet processing part and the communication packet of the user, and the second identifier; and
a setup management part for setting the first correspondence information and the second correspondence information based on the third correspondence information.

4. The communication system according to claim 3, wherein a packet processing part assignment part of the management server assigns the packet processing part of the packet processing unit based on one or more of CPU performance, a memory quantity, a position of the packet processing part, and communication performance to the packet processing part.

5. The communication system according to claim 1, wherein a transport technology used in the second network provides a larger number of supportable nodes than a transport technology used in the first network does.

6. The communication system according to claim 1, further comprising:
a plurality of the second networks.

7. The communication system according to claim 6, further comprising:
a plurality of network relay processing units connected to the plurality of the second networks, respectively.

8. A network relay processing unit for performing relay processing between a first network and a second network, each of which consists of a plurality of virtual networks whose communication ranges are divided logically, the network relay processing unit comprising:
an interface connectable to the first network and the second network;
first correspondence information that shows a correspondence between a first identifier for identifying a communication packet in the first network and a second identifier for identifying the communication packet in the second network; and
an identifier conversion part for converting the first identifier for identifying the communication packet based on the first correspondence information,
wherein a network transport technology of the virtual networks of the second network as a relay destination enables a larger number of supportable nodes than a transport technology of the virtual networks of the first network as a relay source.

9. The network relay processing unit according to claim 8, further comprising:
a network conversion part that converts received communication-packet communication protocol information into a packet format suitable for a transport technology of one of the virtual networks of the second network as the relay destination.

10. A management server for managing relay processing between a first network and a second network, each of which is constructed with a plurality of virtual networks whose communication ranges are divided logically, the management server comprising:
a packet processing part assignment part for assigning a packet processing part that performs data reference and/or rewrite processing of a communication packet and is connected to the second network;
first correspondence information that shows a correspondence between a first identifier for identifying a communication packet in the assigned packet processing part and the first network; and
a second identifier for identifying the communication packet in the second network.

11. The management server according to claim 10, further comprising:
a network relay processing unit management part for setting second correspondence information that shows a correspondence between the first identifier and the second identifier for performing relay processing between the first network and the second network based on the first correspondence information,
wherein the management server has the second correspondence information.

12. The management server according to claim 10, further comprising:
a packet processing unit management part for setting a third correspondence information showing a correspondence between the packet processing part and the second identifier based on the first correspondence information,
wherein a plurality of the packet processing parts performs data reference and/or rewrite processing of a plurality of communication packets.

13. The management server according to claim 10, wherein the packet processing part assignment part assigns the packet processing part based on one or more of CPU performance, memory quantity, a position of the packet processing part of the packet processing unit, and communication performance to the packet processing part.

* * * * *